(12) United States Patent
Purto et al.

(10) Patent No.: US 11,804,994 B2
(45) Date of Patent: Oct. 31, 2023

(54) METHOD AND APPARATUS FOR RECEIVING FSK SIGNALS

(71) Applicant: Topcon Positioning Systems, Inc., Livermore, CA (US)

(72) Inventors: Leonid Victorovich Purto, Moscow (RU); Sergey Sayarovich Bogoutdinov, Moscow (RU); Andrey Vladimirovich Veitsel, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 234 days.

(21) Appl. No.: 17/611,742

(22) PCT Filed: May 14, 2021

(86) PCT No.: PCT/RU2021/000197
§ 371 (c)(1),
(2) Date: Nov. 16, 2021

(87) PCT Pub. No.: WO2022/240308
PCT Pub. Date: Nov. 17, 2022

(65) Prior Publication Data
US 2023/0224198 A1 Jul. 13, 2023

(51) Int. Cl.
*H04L 27/148* (2006.01)
*H04L 27/00* (2006.01)

(52) U.S. Cl.
CPC .... *H04L 27/148* (2013.01); *H04L 2027/0067* (2013.01)

(58) Field of Classification Search
CPC ............... H04L 27/148; H04L 2027/0067
USPC ........................................... 329/300
See application file for complete search history.

(56) References Cited

U.S. PATENT DOCUMENTS

| 6,081,691 A | 6/2000 | Renard et al. |
| 2014/0247904 A1* | 9/2014 | Eliaz ............ H04L 1/0054 375/297 |

FOREIGN PATENT DOCUMENTS

| RU | 2548173 C2 | 4/2015 |
| WO | 2015/042411 A1 | 3/2015 |

OTHER PUBLICATIONS

Search Report in PCT/RU2021/000197, dated Jan. 20, 2022.
Written Opinion in PCT/RU2021/000197, dated Jan. 20, 2022.

* cited by examiner

*Primary Examiner* — Richard Tan
(74) *Attorney, Agent, or Firm* — Bardmesser Law Group

(57) ABSTRACT

Method of demodulation of M-CPFSK signal, includes receiving the M-CPFSK radio signal; moving it to zero frequency; sampling at no less than double a frequency of symbols; storing the samples with their amplitude and phase for at least L4 symbols; demodulating the sampled signal in three stages, wherein each stage includes iterating over symbol values within a block of symbols, of length is L1, L2 and then L3; in the first stage, N1 symbol sequences out of all possible symbol sequences are iterated over, at the second stage, N2 symbol sequences out of all possible symbol sequences are iterated over, and at the third stage, N3 symbol sequences out of all possible symbol sequences are iterated over, to obtain final symbol values; symbol values obtained at previous stage is used in a next stage to reduce a number of symbol sequences; and determining encoded bits based on final symbol values.

38 Claims, 12 Drawing Sheets

METHOD AND APPARATUS FOR RECEIVING FSK SIGNALS

CROSS REFERENCE TO RELATED APPLICATIONS

This application is a US National Phase of PCT/RU2021/000197, filed on May 14, 2021, incorporated herein by reference in its entirety.

BACKGROUND OF THE INVENTION

Field of the Invention

The present invention relates to receiving and processing digitally modulated constant envelope frequency shift keying signals (FSK), in particular, to continuous phase FSK or continuous phase modulation CPM signals in a GNSS receiver.

Description of the Related Art

Constant envelope (amplitude) signals are characterized with a peak/crest factor equal to unity. Such signals have an important role in communications systems. In a number of cases, this only possible modulation meets the requirements of the transmitter's spectral mask and does not cause serious signal distortions in high-power transmitters. There are known different methods of generating digitally modulated signals with constant envelope, see reference [1a]. The main type of modulating digital data with constant envelope is frequency shift keying (FSK) which is in practice always implemented as continuous phase FSK (continuous phase frequency shift keying—CPFSK) or equivalently—continuous phase modulation (CPM).

Another way of naming continuous phase modulation is PCM/FM (pulse code modulation/frequency modulation). For purposes of the present discussion, the present concept is applicable to PCM/FM, CPM (including multi-h CPM), CPFSK and even just FSK.

There are known different reception methods of spectrally limited CPFSK or CPM signals. Basic principles of these methods are described in fundamental texts [1], [2]. Note that the name of the same methods in different references does not also coincide.

There is a method of non-coherent signal reception [3] called in many sources and corresponding documentation "limiter/discriminator receiver". According to this method, the demodulation of each symbol is produced separately. The value of the symbol is determined by estimating the frequency at the output of the frequency detector at a time when there is no inter-symbol interference. The frequency detector estimates the instantaneous frequency as a derivative of the phase. If, during signal generation, the inter-symbol interference has been introduced into it, and it has not decreased to zero over the entire time interval T, during which this symbol is transmitted, then this inter-symbol interference can be eliminated using equalizers of various types.

The advantage of this method is its simplicity, which is especially important in high-speed data transmission (for example, for Bluetooth). Another advantage of this fully incoherent reception method is its stability to quickly changed carrier frequency, and inaccuracies of modulation index determination. The main drawback of this method is a considerable reduction in interference immunity (about 5 dB loss is typical across the entire bit error rate—BER—curve).

There are a number of methods for demodulating this signal type based on the maximum likelihood (ML) principle. It is known that a coherent demodulator, also known as the Maximum Likelihood Sequence Detector (MLSD), has the maximum possible noise immunity when receiving a message of a finite length, with the detector iterating through all possible combinations of symbols within a given message and selecting a combination minimizing the discrepancy between the given sequence and the received signal. Obviously, when the message is long, the implementation of the MLSD demodulator in such a form seems to be nearly impossible.

Reference [1], [2] describe a method of implementing MLSD using an algorithm identical or equivalent to the Viterbi algorithm. In a classical implementation, it is assumed that a modulation index $h=m/p$ is a fraction with coprime numerator m and denominator p. In addition, the unmodulated carrier phase is considered to be known and/or practically unchangeable. Then, at the duration L of the phase response to a single pulse, where L is the number of symbols covered by the impulse response, and the number M of variants of the value of each symbol, the number of states of the Viterbi algorithm is $p*M^{L-1}$ for an even m, and $2*p*M^{L-1}$ for an odd m. When a new symbol arrives, the demodulation process is equivalent to decoding one new bit or a portion of bits in the Viterbi algorithm, which implements a trellis-type FEC decoding. The advantage of this method is that the demodulator's noise immunity is approaching the characteristics of an ideal MLSD. The disadvantages of the method are its applicability only for some h, and inability to operate in conditions that need fast carrier phase tracking based on the data itself.

Note that if p and L are large, the number of calculations becomes unacceptable or close to unacceptable even at M=4. The necessity of minimizing L also causes a number of undesirable consequences, such as an increase out-of-band radiation at the same h. It should be noted that such an unacceptable number of calculations in this method occurs both in software and hardware (microchip) algorithm implementation. In the latter case, there is a need to store a large amount of calculations and hence a need for a large memory capacity.

There are also known a number of demodulation methods for CPFSK or CPM signals based on the MLSD principle, which, in fact, are based on a partially-coherent demodulator [2]. Most of these methods are similar to the above described methods for a fully coherent demodulator, where the MLSD criterion being applied to a limited-length sequences.

Reference [4] describes a partially-coherent method implemented with the help of Viterbi algorithms for any h. It allows a breakdown or lack of knowledge of the initial phase, with the carrier phase information (and its correction) being individual for each state of the Viterbi algorithm. The advantage of such methods is better adaptability to mobile communications with its quickly-changeable carrier phase and Doppler effects, as well as tolerance to any arbitrary modulation index. The main drawback of this method is a considerable computational load (which especially becomes greater in microchip implementation) and the need to select a small L. In addition, in Viterbi algorithm, there is present phase information and, in fact, a PLL, causing interference immunity degradation which is worsening with growth of M, which was noticed by the inventors.

There are known methods of reducing the number of states in the Viterbi algorithm. Despite certain improvements, the disadvantage of these methods is still a great computational complexity, and as a rule, even greater inability of such algorithms to be implemented in a microcircuit, as well as additional loss of noise immunity.

Reference [5] describes an apparatus and a method according to which a partially-coherent receiver implementing MLSD criterion comprises a bank of correlators for different symbol sequences. When the correlators covering Lx symbols and M modulation levels of the mentioned type (i.e., M-ary CPM or CPFSK modulation) are used, the correlator bank contains $M^{Lx}$ correlators of Lx long. The transmitted symbol sequence is determined by the maximal value at the correlator output. In one embodiment [10] of the method done for academic purposes, i.e., at relaxed limitations to the number of calculations, an example for M=4 and Lx in the range of 7 to 10 is described. The advantage of the method is its versatility in modulation index h, weak effects of the duration of phase response L, full absence of PLL. A drawback of the method is its unacceptable amount of computational work at large Lx and M. It should also be noted that there is a strong edge effect occurring at great M when the symbol on the boundary at Lx symbols is equal or close to ±(M−1). As a result, even at Lx=7 the noise immunity provided by this method loses a few dB. Another drawback of this method is a large number of correlators or unacceptable storage volume for the correlator coefficients at large M and/or Lx.

Accordingly, there is a need in the art for a system and method that: are capable to effectively apply a coherent or partially coherent MLSD algorithm to receiving CPFSK or CPM signal with: 1) arbitrary (and sometimes unknown) modulation index h; 2) long impulse response L; 3) Doppler fluctuation and fading, and 4) a low hardware cost (especially in an integrated circuit) and power consumption compared to those known in the art.

SUMMARY OF THE INVENTION

Thus, an object of the present invention is to a method and apparatus for receiving FSK signals that substantially obviate one or more of the disadvantages of the related art.

In accordance with exemplary embodiments a method of demodulation of a multi-level continuous phase frequency shift keying (M-CPFSK) signal with M≥4, includes (a) receiving the M-CPFSK radio signal; (b) moving the M-CPFSK radio signal to zero frequency; (c) sampling the moved signal at no less than double a frequency of symbols, wherein each sample is described via amplitude and phase; (d) storing the samples with their amplitude and phase in a memory for at least L4 symbols; (e) demodulating the sampled signal represented by the amplitude and phase at least in three stages, wherein each stage includes iterating over symbol values within a block of symbols, whose length is L1 at a first stage, L2 at a second stage, and L3 at a third stage, wherein L1<L2<L3<L4, and wherein, in the first stage, N1 symbol sequences out of all possible symbol sequences ($M^{L1}$) are iterated over, at the second stage, N2 symbol sequences out of all possible symbol sequences ($M^{L2}$) are iterated over, and at the third stage, N3 symbol sequences out of all possible symbol sequences ($M^{L3}$) are iterated over, such that $N1/M^{L1} > N2/M^{L2} > N3/M^{L3}$, to obtain final symbol values; wherein symbol values obtained at a previous stage is used in a next stage to reduce a number of symbol sequences being iterated over; and (f) determining encoded bits in the M-CPFSK signal based on final symbol values.

Additional features and advantages of the claimed solution are described in the following disclosure, as well as proved by the actual practice of the invention. These advantages and improvements can be achieved by neural networks that have been constructed and trained in accordance with the claimed method, specifically, following the disclosure, along with the accompanying claims and drawings.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Figure 1:
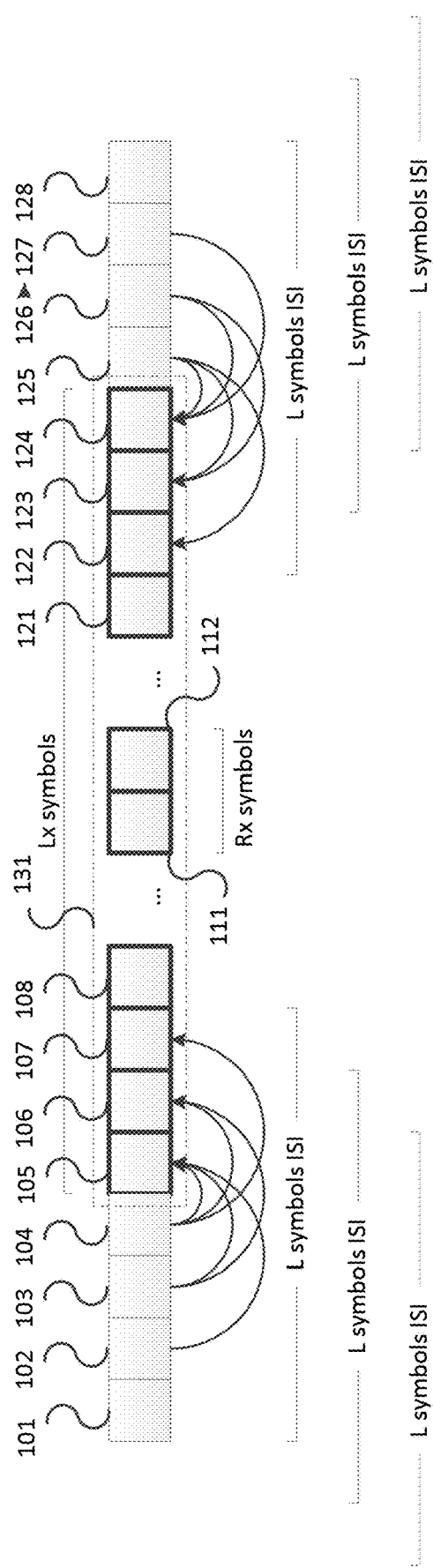
FIG. 1 shows an iterated block in a stream of received symbols.

Reference will now be made in detail to the preferred embodiments of the present invention, examples of which are illustrated in the accompanying drawings.

The proposed method of demodulating a multilevel spectrum-limited CPFSK or CPM signal with at least 4 levels, according to the principle of maximum likelihood, makes it possible to achieve with the help of a microchip-implementable method, with noise immunity practically equal to the noise immunity of a fully coherent MLSD demodulator. In some embodiments it includes a BER about $1*10^{-2}$ and lower. In the proposed method, there is no restriction on the value of the modulation index h, but there is a flexible variation in the coherence degree taking into account the dynamics (Doppler variations), as well as possibility of generating a poor signal within the FSK transmitter.

According to the present method, partially-coherent demodulation is implemented using at least three stages, the possible symbol values being searched at each stage over a certain block of Lx symbols long. At the first stage, the size of the block Lx=L1 is the shortest. The greatest part of all possible symbol values is searched in this block. In some embodiments, for modulation levels M=4 searching for all possible symbol values is done. At the second stage, the size of the block is extended to L2, and a smaller part of all possible symbol values is scanned. At the third stage, the block size is extended to L3, and the smallest part of all possible symbol values is scanned. A reduction in the searched part is achieved by using the information obtained at the previous stage.

According to the present method, the received samples are stored in a block, the samples in this block after each stage, and before the first stage is modified considering the results of the previous stage or initial information. A portion of samples, falling within a window with length Lx, is successively selected from the block at each stage; possible symbol values are iterated over, after that the window is slid to a certain value. In some embodiments of the invention, after such iterating through possible symbol values for the given sample portion, Rx values from the obtained best variant are further used. Note that Rx is always smaller than Lx.

The following operations are carried out at the preliminary and the first stage of signal processing:

(1) An input signal is digitized with a sampling frequency at least double the symbol rate, each sample being described via an amplitude and phase;
(2) The samples are stored for at least L4 symbols;
(3) Preliminary phase demodulation is done based on the preliminary assumption X0 about received symbols, where X0 is the array of length L4, each element of which is a member of an arithmetic progression $S=\{-(M-1), -(M-3), \ldots, -1, +1, \ldots, (M-3), (M-1)\}$ and corresponds to the value of the received symbol;
(4) For the given L1 and R1, where L1<L4, and R1<L1, D1 demodulations of samples is done by the suboptimal method for L1 symbols, where $D1 \approx (L4-L1)/R1$, and blocks $X1_1 \ldots X1_{D1}$ with specified preliminary L1 symbols in each demodulation are obtained, each demodulation being performed by iterating through $M1^{L1}$ variants of estimated symbols, where M1=4 if M=4, and M1=4 or 5 if M>4, here, adjacent demodulations estimate L1-R1 common symbols in overlapping blocks that correspond to one movement of slid window;
(5) R1 corrections of preliminary symbol values are taken from blocks $X1_1 \ldots X1_{D1}$ and placed into block X1.

Of note in the proposed method is that it approaches a demodulated carrier at each stage of the signal processing. Since a signal modulated by CPM or CPFSK has constant amplitude and modified (modulated) phase, the samples after phase demodulation have to look like those of non-modulated carrier, if the symbol sequence has been correctly defined. In other words, both amplitude and phase of correctly-demodulated samples are constant. In practice, however, both amplitude and phase of the demodulated samples are impaired by noise and some other interference. The sequence with demodulated samples that are the closest to the non-modulated carrier is regarded as correct one.

In some embodiments, the correctly-demodulated signal is a shifted carrier. The carrier shift corresponds to one of the used modulation frequencies. Hereinafter, non-modulated carrier means carrier frequency including that shift.

In the process of stage-by-stage demodulation the discrepancy of the samples within the block Lx with non-modulated carrier tends to decline due to both better estimation of symbol sequence inside the block and due to demodulation of samples outside the block at the previous stage. This is unlike conventional methods of iterating through a bank of correlators with length Lx, which do not involve symbol estimation outside the block. Symbols at the boundary of the block with greater absolute values affect edge symbols inside the block considerably. It should be noted that the input signal is multi-level, spectrum limited CPFSK or CPM with partial response, i.e., the response duration L>1. Respectively, each symbol affects up to L/2 neighboring symbols.

FIG. 1 presents a fragment of the block of received symbols, each symbol is presented by several samples. When demodulating Lx symbols in block 131, i.e., starting from symbol 105 and ending with symbol 124, iterating through possible symbol values is implemented only within these symbols. But due to inter-symbol interference including 7 symbols in this example (L=7), symbols 102, 103, and 104, which do not participate in the iterating, still affect symbol 105. Symbols 103 and 104 affect also symbol 106, and symbol 104 additionally affects symbol 107. Similarly, symbols 125, 126, and 127 affect symbols 122, 123, and 124 from the demodulated block. It is evident that non-compensated inter-symbol interference from symbols 102, 103, 104, and 125, 126, 127 increases error probability in symbols 105, 106, 107, 122, 123, 124, the closer to the boundary, the stronger. Symbols 108 and 111 do not subject to inter-symbol interference from the side of symbols out of the block, but if symbols 105-107 and 122-124 were incorrectly assumed, the probability of errors in symbols 108 and 121 also increases.

According to the present method after demodulation of each block of Lx symbols only Rx symbols from the center of the block are further used. In the example above, they are 111 and 112 (Rx=2).

Once the symbol block has been demodulated, the sliding window that chooses Lx symbols is moved to a certain value equal to Rx in a number of embodiments, i.e., equal to the number of results used further. In the considered example of demodulating a symbol block from 105 through 124, symbols from 107 through 126 are moved to the next block of demodulated symbols. The previous demodulated block included symbols from 103 through 122.

At the first stage of signal processing in the considered example, samples with preliminarily demodulated phase (in accordance with the preliminary assumption on received symbols) are placed into an array with symbols 101-128.

In some embodiments at M=4 all previous symbols are equal to −1 or +1. At M>4 preliminary symbols are obtained with the help of a demodulator of different type—not optimal or conditionally optimal demodulator. For example, at M=8 (8FSK) preliminary symbol values are obtained by non-coherent symbol-by-symbol demodulator of a limiter/discriminator receiver type. The example considered here illustrates signal processing both at the first and some other stages. At the first stage, block size Lx=L1, and the number of the used results Rx=R1.

In one of embodiments of the proposed method at four-level CPFSK or CPM, parameter L1=6 or 7, M1=4, R1=1. The preliminary value of each symbol is −1. Since at M=4 the iterated alphabet of symbols is equal to set {−3, −1, +1, +3}, the following corrections {−2, 0, +2, +4} will be verified for each symbol at the first stage relative to the originally assumed value −1. When the correction values are added to −1, these obtained numbers are equal to the original alphabet.

Obtained corrections in a number of embodiments are associated with quaternary symbols. When an L1-long block is demodulated at the above-mentioned parameters, all combinations of L1 symbols are iterated over, i.e., $M1^{L1}$ variants. At L1=6, it is $4^6=4096$ combinations; at L1=7, it is $4^7=16384$ combinations. In the current embodiment, after demodulation of the $i^{th}$ block (i=1 . . . D1) there occurs the found sequence $X1_i$ of L1 symbols, and the correction of only one symbol (R1=1) is transferred to the next stage. Symbols from one-position-moved window participate in demodulation of next, the $i+1^{th}$ block.

In processing of L4 symbols, D1 (L4−L1)/R1 demodulations is produced at the first stage. It is clear that at R1=1, D1 is slightly smaller than L4. Here, an array of corrections X1 with length of D1*R1 is generated.

According to the proposed method, at the second stage of input signal processing the following operations are carried out:

Array X1 is modified such that the modified predicted symbol values, as well as the values increased and decreased by 2 considering periodicity (i.e., wrap around) of the arithmetic progression S would be more probable than the rest M−3 values of each symbol;

Additional demodulation of sample phases according to corrections X1 is performed;

Elements of arrays X0 and X1 relating to the same symbols are added and the results are placed in array X1c;

For the given L2 and R2, where L1<L2<L4, and R2<L2, using the suboptimal method, D2 demodulations are produced for samples of L2 symbols where D2≈(L4−L2)/R2. As a result of this, arrays $X2_1$ . . . $X2_{D2}$ with additional corrections relative to values of array X1c for L2 symbols in each demodulation are formed, each demodulation being produced by iterating through $3^{L2}$ variants of estimated symbols, at this the L2−R2 symbols, which have been already estimated in the adjacent demodulation, being estimated in the slid subsequent demodulation (demodulation of a slid block of L2 symbols);

R2 corrections are taken from arrays $X2_1$ . . . $X2_{D2}$ and successively placed into array X2.

In a number of embodiments at M=4 array X1 is modified on the assumption that at predicted false symbol value −3 its true value +1 is much more likely than value +3. Similarly, at predicted false symbol value +3 its true value −1 is more likely than +3. The modification of array X1 is performed according to the following rule:

If a symbol value with assumed correction in X1, i.e., the future value of array X1c, is equal −1 or +1, then correction in X1 will not be modified;

If a symbol value with assumed correction in X1, i.e., the future value of array X1c, is equal −3 or +3, then correction in X1 is increased or decreased by 2 respectively.

As a result, when at the first stage the predicted symbol is −1 or −3, for the given symbol the values {−3, −1, +1} are verified at the second stage, while +3 is not verified.

Similarly, if at the first stage the predicted symbol is +1 or +3, then at the second stage for the given symbol the values {−1, +1, +3} are verified, while −3 is not verified.

Array X1 at M>4 is modified in a similar way. If a symbol number considering its correction in X1 is ±(M−1), the correction in X1 is increased or decreased up to ±(M−3). Otherwise, the value in array X1 does not change.

In such embodiments, verification of mentioned values for each symbol means iterating through corrections {−2, 0, +2} at the second stage.

In some other embodiments for M=4, the obtained predicted symbol value −3 at the first stage is verified for symbol values {−3, −1, +3} at the second stage, and +1 is not verified. Similarly, if the obtained predicted symbol is +3 at the first stage, {−3, +1, +3} are verified at the second stage, and −1 is not verified. Such embodiments are of great interest at modulation index h=⅓, when code distance between symbols +3 and −3 can be smaller than that between symbols −3 and +1, and between symbols −1 and +3.

In a number of embodiments, array X1 of corrections is not modified, but in addition to array X1, another array is generated, where symbol value +3 is to be verified instead of +1, or −3 is to be verified instead of −1.

Such a verification of these values for each symbol in the embodiments means iterating through {−2*Scale1, 0, +2*Scale2} at the second stage, where the individual set of parameters for each symbol {Scale1, Scale2}={1, 1} or {2, 1} or {1, 2}.

It should be noted that once samples have been additionally modified in accordance with corrections in array X1, and array X1c has no errors, the carrier becomes unmodulated.

Considering these rules of modifying array X1, symbols out of the iterated block (102, 103, 104 and 125, 126, 127 in FIG. 1) can still affect negatively edge symbols inside the block, but on the average (since the number of errors at the first stage decreases) this influence is less than that at the first stage. It can be explained by additional demodulation in the beginning of the second stage, including the availability of improved values in the "disturbing" symbols.

In one of the implementations of the proposed method with a four-level CPFSK or CPM parameter L2=9, R2=1 or 2. In a number of implementations, iterated corrections are associated with ternary symbols. When demodulating a block of length L2 with the specified parameters, part of the L2 symbol combinations are iterated over. It is only $3^{L2}$ options. At L2=9, this is $3^9$=19683 combinations. In such an embodiment, after demodulation of the $i^{th}$ block (i=1 . . . D2), which results in the found sequence X2, of L2 symbols, the correction of just one symbol (R2=1) or two symbols (R2=2) are transferred to the next stage. The demodulation of the next $i+1^{th}$ block will involve symbols from the window shifted by one or two positions, respectively. As result, an array of corrections X2 of length D2*R2 characters is formed.

According to the proposed method, at the third stage of input signal processing, the following operations are performed:

additional demodulation of the sample phase according to X2 corrections is carried out;

elements related to the same symbols in arrays X1c and X2 are added and the results are placed into array X2c;

for the given L3 and R3, where L2<L3<L4, and R3<L3, using the suboptimal method, D3 demodulations for L3 symbols are produced, where D3≈(L4−L3)/R3, and arrays $X3_1$ . . . $X3_{D3}$ with additional corrections regarding the values in the X2c array for L3 symbols in each demodulation are obtained, at this, each demodulation is performed by iterating through the most probable error sequences within L3 symbols in the X2c array, the L3−R3 symbols, which have been already assessed in the adjacent demodulation, are evaluated in the slid subsequent demodulation, R3 corrections from arrays $X3_1$ . . . $X3_{D3}$ are taken and sequentially placed into array X3.

In some implementations, a set of most probable error sequences is determined taking into account the rule used when modifying the X1 array.

In a number of implementations, a certain number of sequences $Xx_j$ being iterated over at the third stage are the sequences in the form (first zeros, +2, −2, last zeros) and (first zeros, −2, +2, last zeros), including sequences with missing first zeros or last zeros. These sequences are hereinafter referred to as sequences of the first type.

In some implementations, a number of sequences $Xx_j$ are sequences in the form (first zeros, ±2, last zeros), including sequences with missing first zeros or last zeros. These sequences are hereinafter referred to as sequences of the second type.

In a number of implementations, all possible sequences of the indicated types are verified, i.e., up to 2*(L3−2) sequences of the first type and up to 2*(L3−1) sequences of the second type.

In a number of implementations, sequences of the first type are supplemented with one or more repetitions of fragments +2, −2 and −2, +2, and are also supplemented in some other way, while preserving the zero sum of elements.

It should be noted that sequences of the first type are targeted to correcting pair errors, which are most typical for coherent demodulation of CPFSK or CPM signals. At the same time, the second type sequences are focused on correcting errors that have ceased to be paired due to the fact that during the demodulation of one block at the second stage of signal processing, a paired error occurred, and during the demodulation of another adjacent block (subsequent or previous), these errors did not occur. In this case, only one symbol from the two occurred false symbols is taken for further processing.

Thus, it can be said that second type sequences are intended for joining erroneous results from differently demodulated blocks.

In a number of implementations, a certain number of sequences $Xx_j$ are sequences containing at least one element with modulo greater than 2. Such sequences are especially relevant for M=4 and modulation index h=⅓. In some embodiments with limited computational capabilities, L3=16 and R3>1. In some other embodiments, L3≥20 and R3=1.

According to the proposed method, after the third stage of signal processing or simultaneously with these stages, the following operations are performed:
- the elements related to the same symbols in the arrays X2c and X3 are added, and thus the final value of the received symbol is obtained;
- using the final value of the symbol, the bits encoded by this symbol are determined, then using the bits encoded in D3*R3 symbols, the information carried in the received signal is obtained.

In a number of implementations, for each demodulation for the given L3 and R3, that is, at the third stage of signal processing, predetermined patterns with the most probable error sequences are iterated over. Here, the corrections leading to the final symbol value outside the specified arithmetic progression S are not allowed. For example, if at M=4 some symbol in X2c is +3, and in the checked error sequence from the specified pattern the value of this symbol is proposed to be further increased, then such a verification is rejected.

In a number of implementations, for the given L3 and R3 in each demodulation the iterating through the predetermined patterns is repeated several times, the chosen pattern being copied or added to the temporary array X3t after each single iterating through all or part of patterns, then array X3t becomes one of the arrays $X3_1 \ldots X3_{D3}$.

Figure 2:
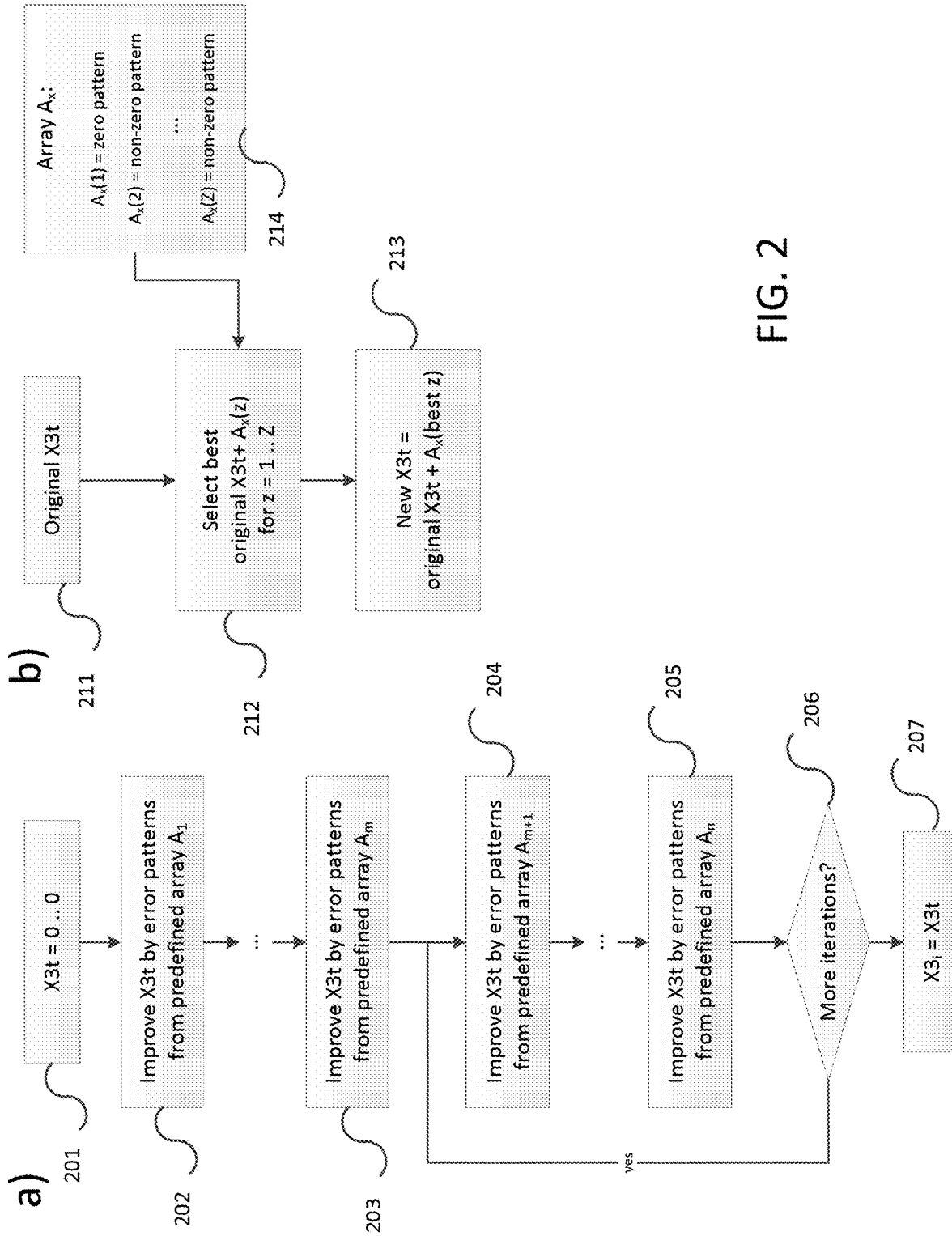
FIG. 2 shows a sequence of actions of a block demodulation at third stage

This sequence of actions is illustrated in FIG. 2. In FIG. 2, part (a), at the third stage of signal processing error sequences are first iterated trough a priori generated arrays $A_1 \ldots A_m$. These sequences are iterated over once. Then, sequences of arrays $A_{m+1} \ldots A_n$ are verified. All the operations related to iterating sequences from array $A_1$ are united in action 202. Similarly, all the operations related to iterating sequences from arrays $A_m$, $A_{m+1}$ and $A_n$, are united in actions 203, 204, 205. Each of these actions is performed in a similar manner, i.e., it can be implemented as a procedure shown in FIG. 2, part (b).

Two parameters are fed to the input of the procedure: the currently-best correction sequence X3t (designated as 211) and one of the arrays with iterated sequences of extra corrections (designated as 214). As above, the iterated sequences are patterns of probable errors arising at the end of the second stage in array X2c. It is assumed that errors in X2 can be absent. Correspondingly, array 214 includes a zero-sequence, i.e., such a sequence which does not change parameter 211 being added to it, as well as Z−1 sequences with non-zero elements.

Verification of the sequences from array 214 is produced in cycle 212. One of sequences of array 214 is added to the original sequence 211, after that the sequence with best results is stored. The output of the procedure, which is designated 213, is a sum of parameter 211 and the chosen sequence from array 214.

So, at the input of actions 202, 203, 204, 205 there are different values of sequence X3t. A final array with corrections 207, thus, is a sum of some sequences from arrays $A_1 \ldots A_n$.

In some embodiments, expected error sequences that are iterated one time (operations 202, 203) are the sequences of the second type.

In other embodiments, when comparing the iterated symbol values the best version is such that the sum of demodulated samples within interval of the symbols would be maximum. Such an approach is hereinafter named the first approach.

In some other embodiments, when comparing the iterated symbol values the best version is such that mean-square error of demodulated samples compared to the reference vector is minimal. Such an approach is hereinafter named the second approach. In some implementations, the reference vector is equal to the arithmetic mean value of demodulated samples.

It should be noted that interference immunity of the second approach when the reference vector is equal to the arithmetic mean value of demodulated samples is identical to that of the first approach.

In some embodiments, the second approach is done as follows: when CPM signal with the finite number of phase states (h=m/p, m and p are prime numbers) is received, the reference vector is equal to the arithmetic mean value of demodulated samples, but its phase is rotated to coincide with the nearest CPM phase state. The CPM phase states are described by expression $\phi+2*\pi*i/k$, where k is the quantity of phase states, and i is the number of a phase state from 1 up to k. Note that k=p at even-numbered m and 2*p at odd m.

In some embodiments, $\phi$ is estimated by a PLL according to the arithmetic mean of demodulated samples at the demodulation of previous symbol blocks.

In other embodiments, the first approach is applied to the first and second stages of signal processing and version comparing, while the second approach with mentioned features is applied to the third stage.

Let us consider an example with four-level CPM (M=4) and h=⅓. Such a signal is assumed to have 6 phases with 60 degree-increments. Since demodulation of each block requires its own initial phase, the obtained demodulated samples will have one of six possible phases from time to time. Note that all demodulated samples in the block have the given phase. When there are no distortions and symbol values have been correctly determined, these phases are not noisy. Reference vector V calculated as the arithmetic mean of demodulated samples will have one of six non-noisy phases with 60-degree increments. When distortions or errors are present, the reference vector is noisy. Nevertheless, if the phase of the reference vector is distorted by less than 30 degrees, and PLL tracks φ parameter correctly, then its true non-noisy phase can be determined for the given vector. Then, vector V is further rotated such that its phase would be equal to the non-noisy phase. The obtained vector Vc is further used as a reference vector to determine any deviation between it and demodulated samples. The original vector V is then used in PLL to adjust parameter φ.

Discrepancy of demodulated samples and the unmodulated carrier signal calculated by the proposed methods is a scalar also referred to as metrics. Depending on embodiments, a minimal or maximal metrics corresponds to the best result, that is the most likely assumption on the received symbol sequence.

Figure 3:
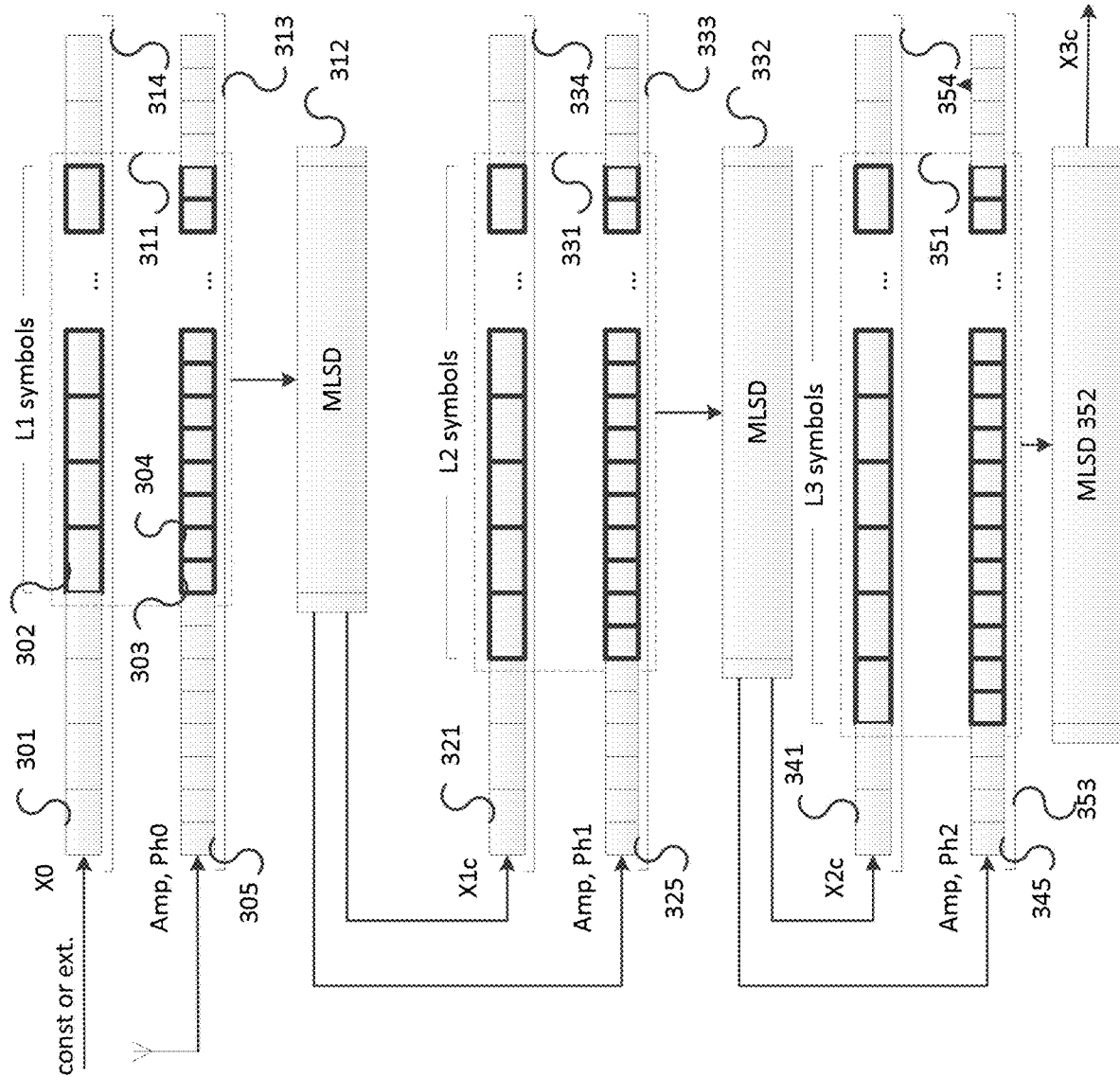
FIG. 3 illustrates a whole process of three-stage signal processing.

The process of three-stage signal processing according to the proposed method is illustrated in FIG. 3. The received signal in the form of amplitude and phase after preliminary demodulation is placed in array 313. This array can be considered as two arrays: one array with sample amplitudes and the second one with sample phases. For this example, sample 305 is the latest in time. Once two new samples have been added, a predetermined value of the corresponding symbol is put in element 301 of array 314. Both arrays are moved forward. When R1 new symbol values are added to array 314, block 311 with L1 symbol values, starting from symbol 302, is demodulated. In this example, the interval of L1 symbols includes 2*L1 samples. Note that two samples 303 and 304 correspond to symbol 302.

Block 311 is demodulated with the help of the above-described MLSD algorithm 312 for the given L1 and R1.

As arrays 313 and 314 are moving forward, and symbols are demodulated within the sliding window 311, arrays 333 and 334 are filled up. The samples in array 333 have the same amplitude as they have in array 313 but a different phase. Array 334 contains specified symbol values obtained at the first stage of signal processing.

Once R2 new symbol values have been added to array 334, block 331 is demodulated, the arrays 333 and 334 after filling being moved forward the same way as arrays 313, 314.

When block 331 is demodulated with the MLSD algorithm 332, arrays 353 and 354 are filled in a similar manner.

It should be noted that array 314 is also named array X0 in the above description, array 334 is named as array X1c, and array 354—array X2c.

At the third stage of signal processing block 351 is demodulated. In the long run, at the output of the MLSD algorithm implemented in 352 final symbol values are generated and placed into array X3c.

In some embodiments after demodulation at the first or second or third stages of signal processing with parameters L1, R1, or L2, R2, or L3, R3, or after obtaining final symbol values, additional demodulation of sample phases is produced for some modulation indexes different up and down from the initially assumed values, and for some carrier frequency values different up and down from the initially assumed values. The demodulation results after these operations are used only for calculations of mean-square errors from the reference vector, with these MSE at different carrier frequencies being used for frequency lock loop (FLL), and similarly calculated MSE at different demodulation indexes being used for specifying modulation indexes.

In some embodiments, for example, to specify carrier frequency, samples in block 311, or 331, or 351, or similar samples after demodulation 352, are additionally demodulated by delta frequency Δf1 first, and then by delta frequency Δf2, after that by some other delta frequencies. After each demodulation by a delta frequency, a sample block is additionally demodulated by the MLSD algorithm similar or identical to the above described. In other embodiments, after each demodulation by delta frequency, sample block is compared with unmodulated carrier. A metric, similar to the described above which was used for determining the received symbol sequence, is calculated for each delta frequency. After that, a frequency error is determined by the ratio of the metrics.

Modulation indexes are tuned in a similar way: samples in block 311, or 331, or 351, or similar samples after demodulation 352, are additionally demodulated to find the error of modulation index Δh1, then Δh2, and after that, for a number of other errors of the modulation index. The procedure after each demodulation is the same as for different delta frequencies: first, metrics are calculated and then based on these metrics modulation index error is calculated.

In some embodiments where trellis coding is used, demodulated bits are specified by a FEC decoder, then, obtained improvements yield a set of patterns similar to those used at the third stage of signal processing for each demodulation for the preset L3 and R3. Then, additional demodulations similar to those for preset L3 and R3 are performed. In the result, improvements similar to those $X3_1 \ldots X3_{D3}$ are obtained, and a new version of the final values of the received symbols is generated based on these improvements.

In some embodiments, extra demodulation based on FEC decoding is carried out according to the algorithm shown in FIG. 2. Note that for some embodiments array 214 does not include zero pattern.

In some embodiments, the arrays with expected error sequences, iterated after FEC decoding, are a subset of the arrays of sequences being iterated over at the third stage of signal processing. In particular, when encoding even and odd symbols by different FECs and detecting a single error in the Lx block by only one decoder, the array of iterated error sequences includes sequences of the first type with a nonzero element in the position where the error was found by the decoder FEC.

In a number of embodiments, for each demodulation with given L3, R3, in addition to arrays $X3_j$, where j=1 ... D3, several more arrays similar to $X3_j$ are formed. These arrays store the most likely values of the received symbols (or improvements of these values) at fixed values of some part of the symbols. In a number of embodiments, for each demodulation, additional arrays of results are formed for all versions of values in fixed symbols within a given range. So, in some implementations, when M=4 (4-CPFSK or 4-CPM), the positions of K symbols are indicated, each of which can take all possible values. Accordingly, $4^K$ variants of the best symbol values are stored in the arrays formed during demodulation. One of these arrays is the $X3_j$ array. In other implementations, for the specified K symbols, the values of the expected symbol sequences (or their improvements) are stored, in which each of the K symbols at least once takes each of the possible values.

With this implementation, (M−1)*K+1 output arrays are formed, one of which is the $X3_j$ array. Other implementations store results with the values of the specified K characters in an shortened range. For example, the results are stored when the values of the indicated symbols differ from the most probable by no more than 2. That is, three possible values of each of the indicated symbols are assumed.

Moreover, in these embodiments, the values or improvements for non-fixed L3-K symbols are determined according to the principle of maximum likelihood, as in the formation of an array $X3_j$.

In some embodiments, at each demodulation with given L3, R3 there are generated some more arrays like array $X3_j$, in which there are a few other versions of improving sequences for the received symbols with better metrics (but worse than that of $X3_j$). In other embodiments, these iterated in a descending order depending on a metric value.

In some embodiments, some other arrays like $X3_j$ are generated with calculating metrics similar to that of array $X3_j$, then, a "soft" output for each demodulated bit is calculated based on given metrics, this soft output is further fed to a soft FEC decoder.

In some embodiments, when each expected symbol sequence Xx with length Lx, where Lx=L1, or L2, or L3, is verified, the following actions are taken:
  Sample phases are put in matrix-row A of Lx*r long, where r is the number of samples per symbol;
  Sample amplitudes are put in matrix-row Amp of Lx*r long;
  A fragment of phase response to a symbol is placed in each row of matrix B with dimensions [Lx, Lx*r] at a position equal to the row number, while the symbol value is 1;
  Rows of matrix B are multiplied by the elements in the expected sequence Xx, with the elements corresponding to row numbers, thereby obtaining matrix B1;
  Row-matrix C=A+sum(B1) is calculated, where function sum(B1) calculates the row-matrix with elements equal to sums of columns of the original matrix B1;
  Row-matrix V=CORDIC(Amp,C) is calculated;
  Complex values of matrix V are used to calculate metrics of the expected sequence Xx in accordance with the selected criterion of maximal likelihood.

Figure 4A:
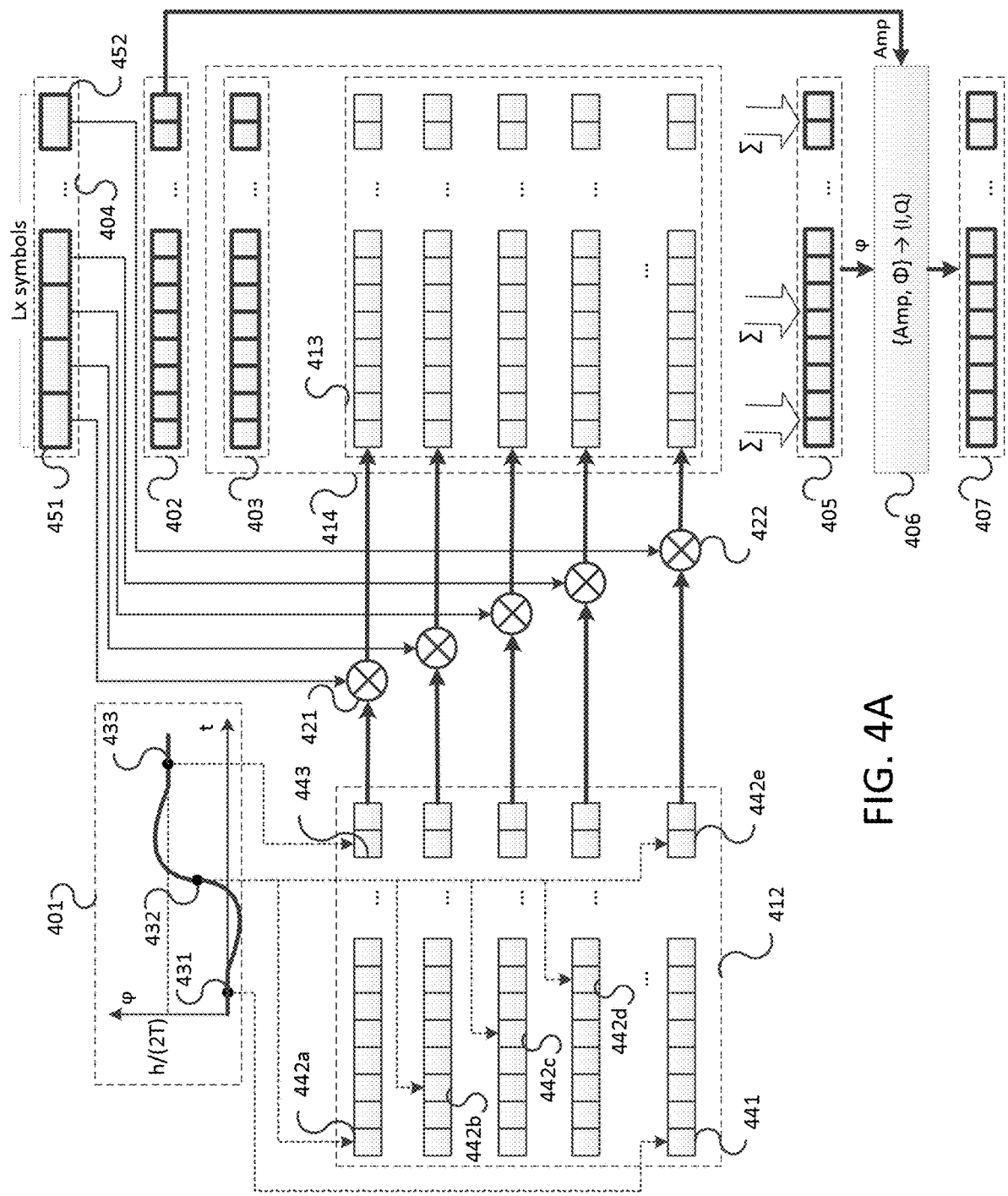
FIG. 4A shows the operations to verify one symbol sequence.

The operations are shown in FIG. 4A. In this example, amplitudes of Lx*r samples (r=2) are placed in row-matrix 402, and phases are placed in row-matrix 403. The predicted symbol sequence Xx is placed in row-matrix 404. Note that symbol 451 is the first one in time, and symbol 452—the last one. In addition, function 401 determining phase response to the symbol with value +1 is also assigned. This phase response is 0 before a symbol arrives, then, in the middle of the symbol it takes on value (h/4*T), after that, after ending the transition process, it is (h/2*T), where h is the modulation index, and T is the duration of the symbol. Fragments of this phase response sampled at frequency r/T are placed in matrix rows 412. The value in the vicinity of point 432 is placed in elements 442a, 442b, 442c, 442d, . . . , 442e. Later values of the function are put in next elements of each row. In particular, value 433 equal to (h/2*T) is fed to element 443. Similarly, earlier function values are fed in previous elements. So value 431 equal to zero is fed to element 441 of the last row.

Thereafter, each row of matrix 412 corresponding to matrix B in the above description is multiplied by the value in the corresponding element of matrix 404. The results are placed in matrix 413 corresponding to matrix B1 in the above description. After that, the columns of matrix 413 are summed, the values of the corresponding elements of the matrix 403 are added to the obtained values. The results of the addition are placed in the matrix 405. Thus, the vertical sum of all the elements inside frame 414 falls into each element of matrix 405. The phases obtained in 405, as well as the amplitudes from matrix 402 are fed to converter 406 where these values are converted to quadratures. The results of the recalculation for each sample are placed in the final row-matrix 407 corresponding to the matrix V in the above algorithm.

In some embodiments conversion 406 is produced by CORDIC algorithm. In some other embodiments, sine and cosine tables are used instead of CORDIC, these values being multiplied by amplitude to obtain quadrature.

As noted previously, metrics of the given symbol sequence are further calculated based on demodulated values in matrix V. For example, for the first approach (described above) a sum of elements V is calculated first, then either power or amplitude of the obtained complex value of the sum is calculated, and after that, a sequence is selected such that it would have maximum calculated power or amplitude.

In some embodiments, at the first and second stage of signal processing the iterating over verified sequences is produced in array 404. Arrays 402, 403, 412 are kept during the entire process of demodulating the given block.

One skilled in the art will recognize that these operations can also be described as filtering, where the symbol sequence Xx in the row-matrix 404 is filtered using the phase response to a symbol with a value +1 from 401. In other implementations, the phase response to a symbol with a value +1 from 401 is filtered by the symbol sequence Xx in the row-matrix 404, that better correspond to the figure.

Figure 4B:
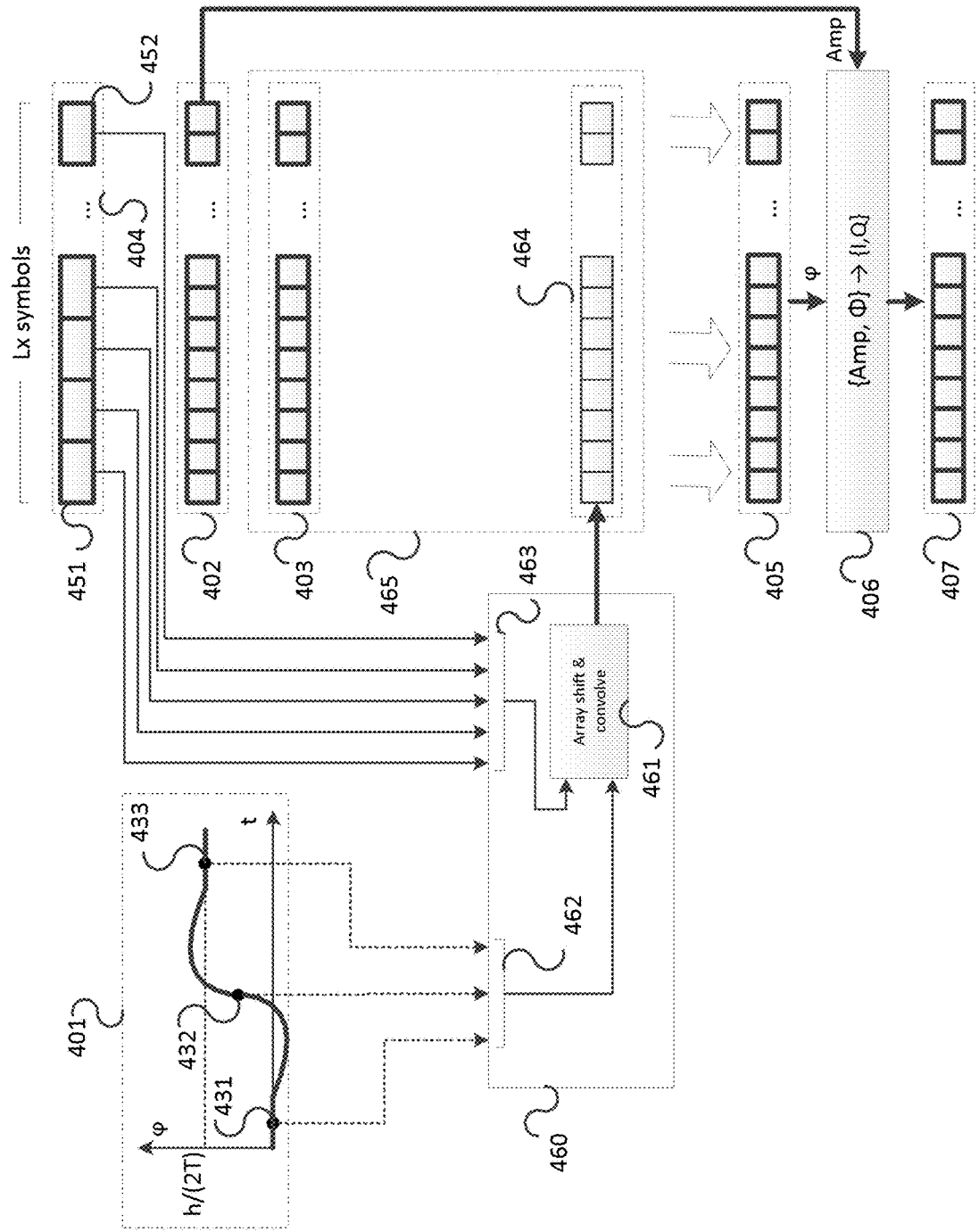
FIG. 4B shows these operations as a filtering representation.

Such an implementation is illustrated in FIG. 4B. A filtering 460 is performed as a number of convolutions 461, where two input arrays are relatively shifted and convolved. It should be noted that each convolution convolves arrays with Lx symbol length. These arrays are obtained from an array of phase response 462 and array of Lx symbols 463. The values in filtered sequence 464, related to the time window with the iterated symbols 404, are subtracted from sample phases 403 stored in the memory for the iterated symbols.

It should also be noted that the array 404 contains Lx values, whereas the array from 401 for Lx symbol length contains Lx*r values. In some implementations the array 463 is formed from the array 404 by filling it with r−1 zeros after each of the Lx values that provides both convolved arrays being of the same sampling rate.

The operations described above can be efficiently implemented in a microcircuit, such as an ASIC, an FPGA, a processor or a math co-processor. This is one of the advantages of the proposed approach compared to a conventional Viterbi algorithm.

In some implementations, for M=4, in addition to the X1 array, the Y1 array is formed, with the modification of the X1 array and the filling of the Y1 array being performed according to the following rule:
  if the value of the symbol with assumed improvement X1 is equal to −1 or +1, then the improvement in X1 is not changed, and a special indication is not made to the corresponding element of the array Y1;
  if the value of the symbol considering its improvement X1 is equal to −3 or +3, then the improvement in X1 is increased by 2 or decreased by 2 respectively, and a special indication is made in the corresponding element of the array Y1;

during multiplication of rows of matrix B by values of the expected sequence Xx when demodulated with predetermined L2 and R2, the elements of array Y1 are considered as follows:

if in array Y1 at the corresponding position there is a special indication on adding +2 to an element in X1 (and further in X1c), and the multiplied element in Xx is +2, or if in array Y1 there is a special indication on changing an element in X1 (and further in X1c) by −2, and the multiplied element in Xx is −2, then the multiplied element of Xx becomes twice as much;

in the rest cases, elements in Xx are not increased.

As noted above, such an implementation can be applied, for example, for M=4 and h=⅓.

In other embodiments, in some rows of matrix B, a fragment of the phase response for one modulation index is placed, and in other rows, a fragment of the phase response for at least one more modulation index is placed. Such an implementation is necessary when receiving a CPM signal with h alternately-changing (e.g., first, second, first, second, etc., or more complex schemes).

In other embodiments, a certain number of sequences of likely symbol improvements in the pattern array are sequences of the first or second type, obtained by shifting one of these sequences forward or backward by a given number of elements.

In some embodiments, in each demodulation at the third stage of signal processing for the given L3 and R3 the following actions are taken in verification of each sequence Xx with length Lx:

Sample phases are put in matrix-row A of L3*r long, where r is the number of samples per symbol;

Sample amplitudes are put in matrix-row Amp of L3*r long;

A row-matrix G with length L3*r is generated so that a fragment of the total phase response to the verified symbol improvements at the corresponding positions is placed in it;

Row-matrix C=A+G is calculated;

Row-matrix V=CORDIC(Amp,C) is calculated;

Metrics of the expected sequence Xx are calculated based on complex values of matrix V and the chosen criterion of maximal likelihood.

It should be noted that this version of implementation differs from the above version with matrix B in that the verified sequence row-matrix G of matrix Xx has been calculated beforehand. It is evident that G=sum(B1).

To verify a few of such sequences from the given pattern array, the following steps are carried out:

Row matrix Gext with length more than Lx*r is generated so that the total phase response to the verified symbol improvements at the corresponding positions is placed in it;

Matrices A, Amp and G are generated in a similar manner for the first verified sequence, the fragment of matrix Gext being copied in matrix G, then matrices C and V are calculated, and the result is estimated;

When verified next sequence, a new matrix G is obtained by copying another fragment of Gext shifted by Hn*r elements, where Hn is the number of modulation indexes used in the signal, relative to the previous fragment.

If one receives single-h CPM signal, then Hm=1. Otherwise, the listed operations starting from Gext generation are repeated Hm−1 times. Each next iteration verifies following sequences by loading in matrix Gext some other values. These new values are also total phase response to verified symbol improvements in the corresponding positions. This technics considers the fact that positions of the variable symbols in the given sequences at different iteration can be related to modulation indexes in a different way.

Figure 5:
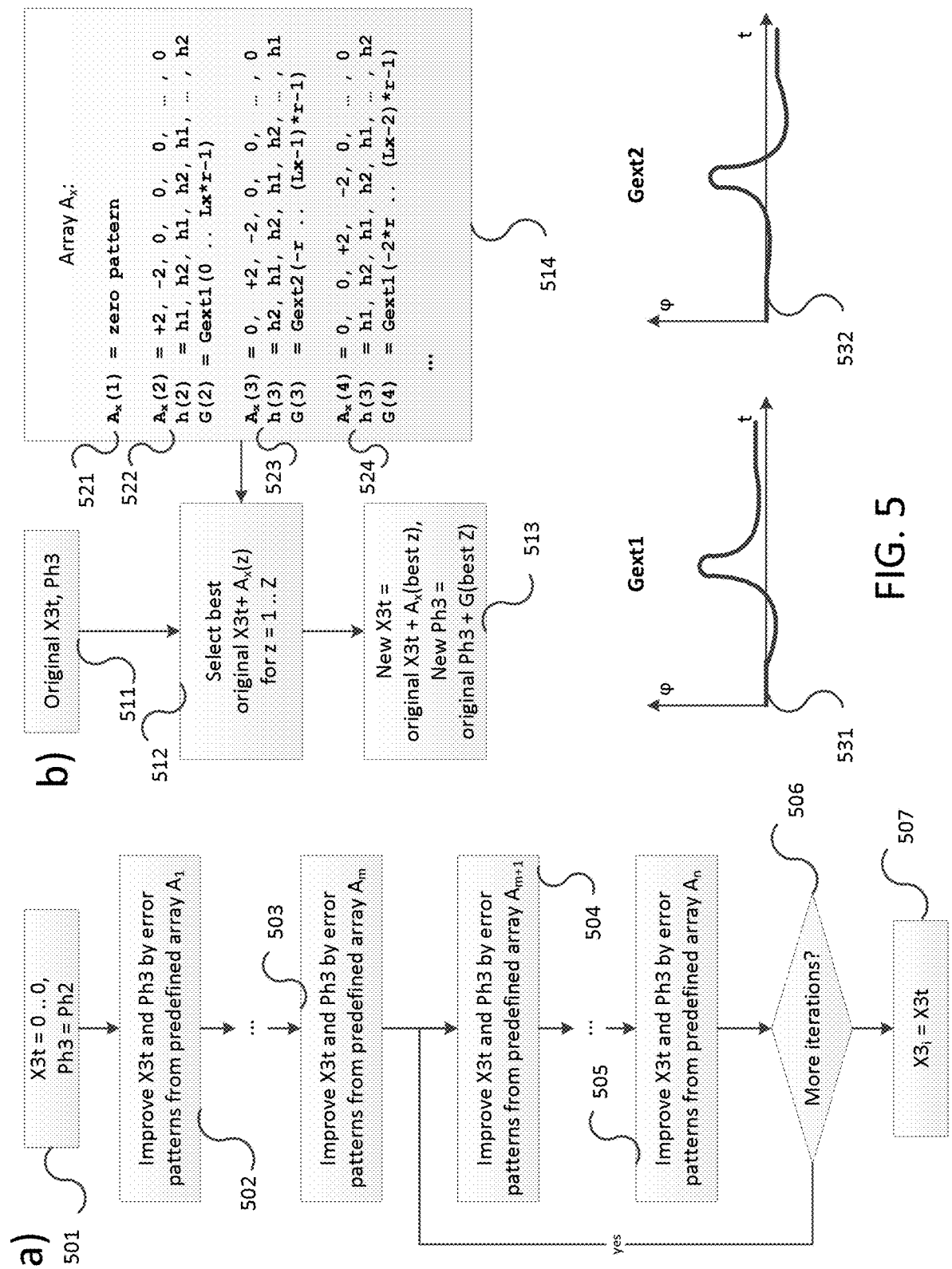
FIG. 5 shows a sequence of actions of a block demodulation at third stage for multi-h CPM.

FIG. 5 shows examples of such an implementation of CPM with modulation indexes h1 and h2. From FIG. 5, part (a) it can be seen that in this implementation, unlike FIG. 2, part (a), phase array Ph3 is updated at the same time as array X3t. At the beginning of the third stage both arrays are initiated based on the results of the second stage (action 501). Then, single actions 502, 503 and repeatedly-performed actions 504, 505 are implemented according to the algorithm shown in FIG. 5, part (b). In this example, in array 514 in addition to zero pattern 521 there is at least one sequence of the first type 522, and sequences 523, 524 . . . , obtained by shifting the first type sequence 522 by 1, 2 and more symbols. Along with the sequences in the array there are stored the corresponding phase responses. For even sequences 522, 524 and so on, these responses are fragments of full response 531. For odd sequences 523 and so on, these responses are fragments of full response 532. Respectively, in iterating sequences with fragments of response 531 are first verified, i.e., even sequences 522, 524 and so on. Then sequences with fragments of response 532, that is odd sequences 523 and so on, are verified. If, for example, sequence 523 is the best one, then at step 513 the elements of this sequence will be added to the contents of array X3t, and the corresponding fragment of phase response 532 is added to array Ph3.

It should be noted that in some embodiments phase responses 531 and 532 are different from each other not only by a different modulation index but also by other parameters of generating a phase response for a certain symbol.

In some embodiments, to verify each supposed symbol sequence Xx with length Lx, where Lx=L1, or L2, or L3, the following actions are taken:

Phase samples are placed in row-matrix A with length Lx*r, where r is the number of samples per symbol;

Sample amplitudes are put in matrix-row Amp of Lx*r long;

A fragment of phase response by a correcting value of a symbol in a position equal to the row number is placed in each matrix row P(u) with dimensions [Lx, Lx*r], at this the correcting symbol value and the phase response related to it being dependent on the index u and row number, the index u being changed within the range of current alphabet interval;

A row with the same number of one of matrices P(u) is placed in each row of matrix P1 with dimension [Lx, Lx*r], the index u being determined according to the corresponding element of the row number in the assumed sequence Xx;

Row-matrix C=A+sum(P1) is calculated, where function sum(P1) calculated row-matrix with elements equal to the sums of the columns in the original matrix P1;

Row-matrix V=CORDIC(Amp,C) is calculated;

Metrics of the assumed sequence Xx are calculated based on the complex values of matrix V and the chosen criterion of maximal likelihood.

This implementation allows receiving and processing CPM or PCM/FM signals with individual modulation indexes (deviation) and normalized phase responses for each symbol value in the general case. For example, for M=4, that is in modulation of quaternary symbols in the received signal each symbol can deliver four versions of pulse shaping in frequency domain that are non-proportional to each other. Depending on the symbol number, the set of four pulse versions for one symbol can differ from the similar set of the other symbol. In some embodiments, only pulse versions for different absolute symbol values are non-proportional to each other. In some other embodiments, normalized phase response is the same for absolute symbol values smaller than (M−1). For example, at M=8, symbols with values {−5, −3, −1, +1, +3, +5} are modulated by a pulse of one type, and symbols with value −7 or +7 are modulated by a different pulse. In another embodiment, at all symbol values the same pulse version is used, but when symbol is equal to ±(M−1), a smaller modulation index is applied.

Apparatus

The proposed method can be implemented in a receiver comprising one or several iterators described below. In particular, a receiver with demodulating a multi-level spectrum-limited CPFSK or CPM signal with M≥4 levels based on the principle of maximal likelihood, the devise comprising:
- an antenna receiving the M-CPFSK radio signal;
- a mixer that moves the M-CPFSK radio signal to zero frequency;
- an analog to digital converter (ADC) sampling the moved signal at no less than twice a frequency of symbols, wherein each sample is described by an amplitude and phase;
- a memory storing the samples, including their amplitude and phase, for at least L4 symbols;
- at least one iterator that iterates through a number of symbol sequences within Lx symbols;
- a processor.

In some embodiments the iterator comprises:
- an Lx-digit generator of symbol sequences,
- a storage with a phase response to one symbol,
- a filter with a first input connected to the storage, and a second input connected to the Lx-digit generator, the filter outputting Lx*r calculated phases,
- Lx*r summers that sum the Lx*r calculated phases with Lx*r phases stored in the memory,
- a converter that converts the Lx*r summed phases from the summers and corresponding amplitudes stored in the memory into I/Q complex values,
- an estimator inputting the I/Q complex values and producing a metric of likelihood of a symbol sequence associated with the Lx symbol sequences from the Lx-digit generator,
- a result storage that stores the Lx symbol sequences when the estimator indicates that the sequence from (1) as being a best estimate compared to a previous estimate;

Here, the processor is connected to the ADC output, to the memory where the processor stores at least L4 symbols, to the storage with phase response where the processor stores the phase response, and to the result storage where the processor reads results produced by the iterator. The processor is configured to determine encoded bits in the M-CPFSK signal based on the result in the result storage.

Figure 9:
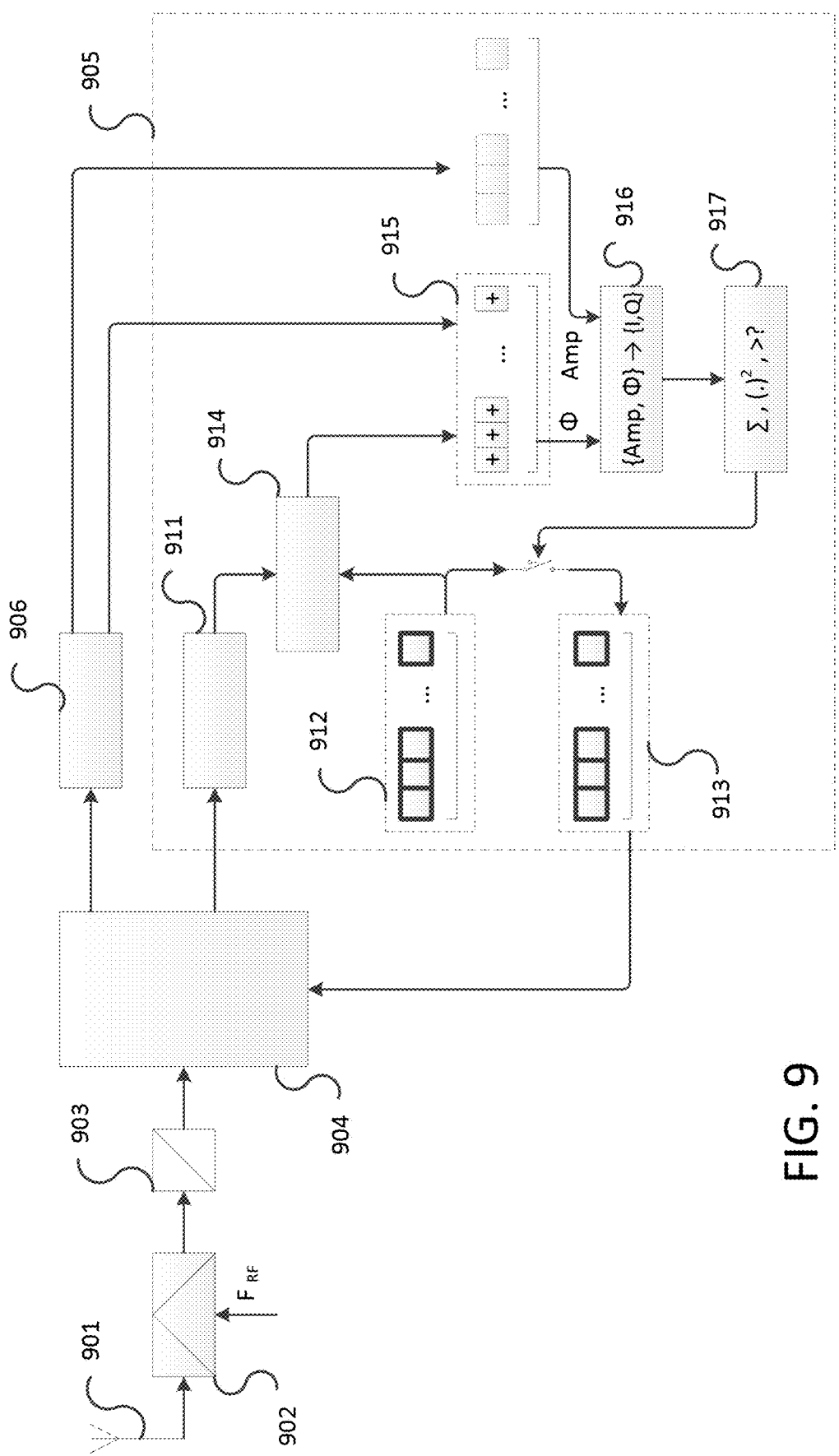
FIG. 9 shows an exemplary receiver according to the concepts described herein.

An exemplary receiver is illustrated in FIG. 9, although it is understood that this is just one possible implementation, and the invention is not limited to the specific hardware illustrated in FIG. 9. As shown in FIG. 9, an antenna 901 is connected to mixer 902 which in turn is connected to ADC 903 and output of the ADC is connected to processor 904. The processor feeds samples represented by amplitude and phase to memory 906. The processor also stores phase response to one symbols in storage 911, which is part of iterator 905. The iterator also contains Lx-digit generator 912, result storage 913 that stores the Lx symbol sequences, filter 914, Lx*r summers 915, convertor 916 and estimator 917.

In some embodiments the filter calculates Lx*r phases simultaneously. In such an embodiment the filter includes Lx*r convolvers, each convolver performing a convolution of first and second arrays, the first array corresponding to phases from the storage with phase response to one symbol, and the second array being the Lx digits from the Lx-digit generator, wherein the convolvers output the Lx*r calculated phases.

In some embodiments the storage with phase response to one symbol holds values in an internal array and each convolver receives in the first array at its input the values from the internal array with step r. Here, the first array is formed for a convolver i by taking values from the storage with numbers i+k*r+C, where k=1 . . . Lx, and i is 1 . . . Lx*r, and C is an integer constant. In these embodiments i+k*r+C for i=1 and k=1 corresponds to the first element in the internal array whereas for i=Lx*r and k=Lx it corresponds to the; last element in the internal array.

In some embodiments the summers sums phases at the filter output with corresponding phases stored in the memory by subtracting the stored phases from phases calculated by the filter. In other embodiments the summers sum the results by adding the stored phases to phases calculated by the filter. In the last case, the processor stores into the storage 911 a negative phase response to one symbol with value +1, which equals to phase response to one symbol with value −1.

In some embodiments digits of the Lx-digit generator can represent at least ternary and quaternary alphabet values. To generate the values, in some embodiments, the generator includes a counter, each digit of the counter is ternary and quaternary.

In other embodiments, the iterator includes:
- an Lx-digit generator of symbol sequences, the generator is similar to described above;
- an array with Lx*r amplitudes and array with Lx*r phases where r is an integer at least 2;
- a first array with L*r phase increments being a phase response to one symbol;
- a multi-input multiplier that multiplies Lx*r length arrays by alphabet values of the Lx-digit generator, containing Lx inputs of the first type, Lx inputs of the second type, and Lx outputs, here the multiplication product of two inputs: an array fed to certain input of the first type and an alphabet value fed to the input of the second type with the element number same as the input of the first type input, being generated at corresponding output;
- a commutator switch, to the first input of which a first array with phase increments is fed, and Lx outputs of which are connected to Lx inputs of the first type of said multi-input multiplier;
- Lx*r accumulators with Lx+1 inputs, each accumulator calculates a sum of elements with the same number in the Lx outputs of the multi-input multiplier plus one element from array with Lx*r phases with the same number;
- a converter of amplitudes and phases into I/Q and a quadrature estimator similar to that described above;
- a controller outputting a flag of the end of demodulation, when the Lx-digit generator generates the required number of values;
- a first copy of the Lx-digit generator storing a generator value at which the quadrature estimator reveals the best estimate compared to that at which the previous best value was stored.

Here, there are means of delivering data from the processor to the array with Lx*r amplitudes, array with Lx*r phases, and the first array with L*r phase increments, means of delivering data from the first copy of the Lx-digit generator to the processor. In some embodiments, the data delivery between the processor and the arrays is implemented via a bus. In other embodiments, the means include direct memory access (DMA).

In some embodiments, the output of the Lx-bit generator is a register with Lx*Mb bits, where Mb is the smallest integer that satisfies: Mb≥log 2 (M). Accordingly, each digit is represented by Mb bits. In other embodiments, the specified generator produces only ternary or quaternary values. In such implementations, each digit is represented by two bits.

In these embodiments, the Lx-digit generator is implemented as an Lx-digit counter, the bits of which can operate with values of at least ternary and quaternary alphabets.

In this case, in a number of embodiments the first array with L*r phase increments is connected to each of the Lx outputs in the commutator switch as follows:

- at the beginning and at the end of the first array with phase increments the array is supplemented with (Lx−L)*r values, so that the values extended at the beginning being equal to the value of the first element in the first array of phase increments, and the values extended at the end are equal to the value of the last element in the first array of phase increments;
- Lx*r values are taken from the expanded array, starting from the element shifted by (i−1)*r, where i=1 . . . Lx corresponds to the commutator switch's output number;
- the Lx*r values are fed to the commutator's output with number i.

Figure 6A:
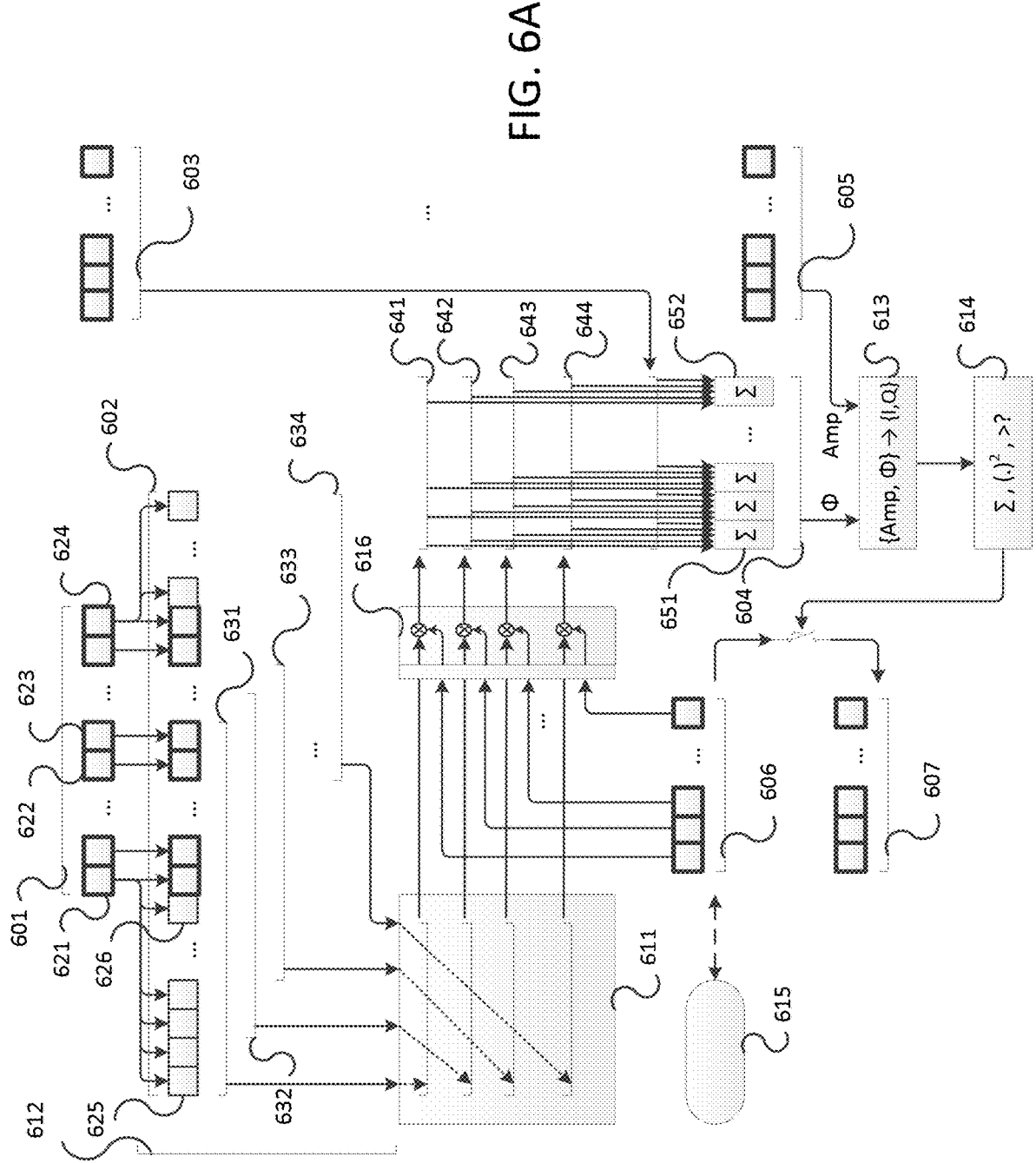
FIGS. 6A, 6B and 6C show examples of hardware implementations of the present invention.

An example of such an implementation is shown in FIG. 6A. The first array with L*r phase increments designated in the figure by number 601 is expanded to array 602, when fed to the first input of the switch 611. In this case, element 621 from array 601 is additionally inserted into elements 625, 626. The end element 624 is expanded in a similar way. A full diagram of switching array 601 when connected to the first input of the switch 611 is marked with a vertical bracket 612. Within switching, fragments of extended array 602, designated as 631, 632, 633, 634, are fed to different outputs of the switch and then go to the corresponding first type inputs of the multi-input multiplier. Moreover, in some embodiments, in particular when implemented in a microcircuit, array 602 is not a separate physically implemented component of the described device. In these implementations, array 602 should be considered virtual, showing in general terms the connection diagram of the elements of array 601 with the outputs of switch 611, but not explicitly located in the microcircuit.

It should be noted that central elements of array 601, in this example 622 and 623, are connected to all fragments of array 602, they are further propagated in switch 611, and thereby fed to all Lx outputs of the commutator switch.

The fragments of array 602 fed to the output of switch 611 are then multiplied in the multi-input multiplier 616 by the values fed to the specified multi-input multiplier at the second type inputs. In this case, the values from the elements of Lx-bit generator 606 are fed to the inputs of the second type. It should be noted that each multiplier in the multi-input multiplier 616 during multiplication can replace the values at the input of the second type with other values. In other words, the values at each input of the second type can be considered not as ready-made multipliers, but as conditional values by which the value to be multiplied is determined.

The outputs of the multi-input multiplier are fed to Lx*r accumulators. In particular, element 625 passed through the multi-input multiplier with a value equal to element 621 is fed to the first of Lx+1 inputs of accumulator 651, and the result of multiplication with element 622, which is the first one in fragment 634, is fed to the input with the Lx number of this accumulator. An element of the array with Lx*r phases, indicated in the figure with the number 603 is fed to the input with the number Lx+1. The multiplication product of multiplying element 623 is similarly fed to the last accumulator 652—to the first input, the other end element from array 603 is fed to the input with the number Lx+1. The value of the end element 602 equal to element 624 is fed to the input with the number Lx of this accumulator.

In the example given, r=2. A fragment of array 632 is shifted by two elements relative to fragment 631. Fragment 633 is accordingly shifted relative to fragment 632.

Accumulator outputs, in particular, the outputs of accumulators 651 and 652 are fed to the second input of amplitude and phase-to-I/Q converter 613. Its first input is connected to the output of array 605 with Lx*r amplitudes. The conversion results are fed to quadrature estimator 614. If the result seems to be better than the previous ones, the contents of 606 is copied to the Lx-digit register of the same capacity 607, which stores the final demodulation result.

A controller 615 outputs a flag of demodulation end. In some embodiments, the controller tracks the overflow in one of digits of generator 606. The generator is implemented as a Lx-digit counter. In other embodiments, the controller tracks a certain value in the generator's digits.

In one embodiment, the iterator contains at least one more array with L*r phase increments which are a phase response to one symbol at a different modulation index h, so that the commutator feeds values from the first array of phase increments to some Lx outputs of the commutator, and feeds values from at least one more the array to other outputs, the values from at least one more array being switched with the output numbered i according to the same rules as in the first array.

Figure 6B:
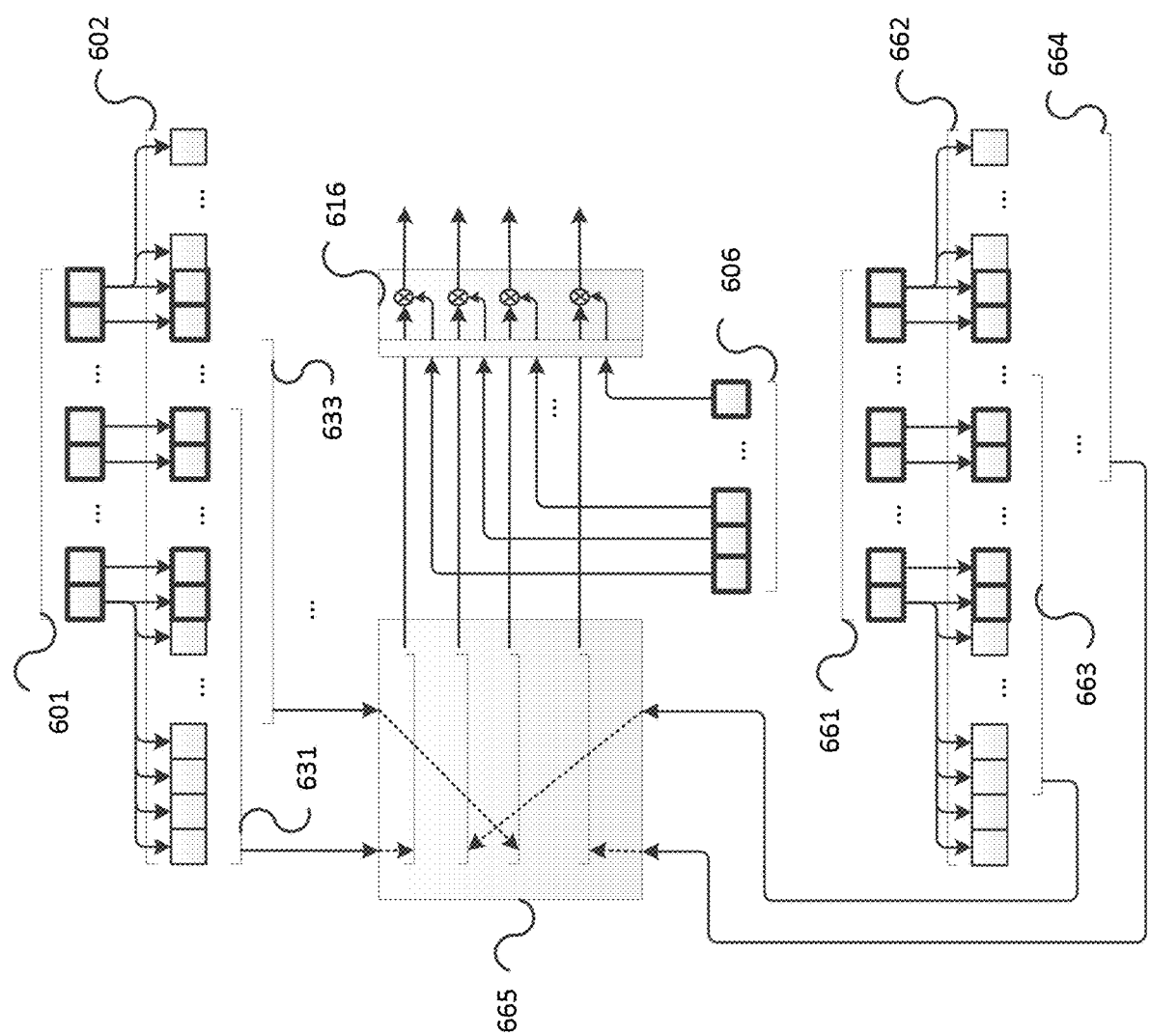

A different implementation than in FIG. 6A is shown in FIG. 6B. In this example, fragments of two arrays are fed to multi-input multiplier 616: from the first array with L*r phase increments designated 601 in the figure, and from the similar second array 661. The second array in the process of switching is also transformed into expanded array 662. As a result, fragments 631 and 633 are fed to the output of the commutator switch and further to the multi-input multiplier, and fragments 632 and 634 shown in FIG. 6A are not fed. Instead, fragments 663 and 664 are fed in this embodiment.

Similarly to this embodiment, in some embodiments where the iterator contains the filter described above, the storage with phase response to one symbol stores a first array with L*r phase increments. The array with L*r phase increments is supplemented at the beginning and at the end with (Lx−L)*r values, the supplemented values at the beginning being equal to the value of the first element in the first array of phase increments, and the supplemented values at the end being equal to the last element in the first array of phase increments.

In some of these embodiments, the storage with phase response to one symbol contains at least one additional array with L*r phase increments, the additional array representing a phase response to one symbol at a different modulation index h, and wherein the arrays with L*r phase increments are symbol-by-symbol multiplexed in the filter so that r phase increments are taken from the first array and not taken from the additional array, then r increments are taken from the additional array and not taken from the first array, and so on In one embodiment, the device also contains at least one set of input data including an array with W amplitudes, an array with W phases, a counter, at this W>Lx*r. In this embodiment, at a certain point in time, the following actions are performed:
- arrays with W amplitudes and phases are moved forward by a predetermined value H multiple to r;
- during each movement values in some successive H elements of the amplitude array are zeroed;
- after each movement the oldest values of Lx*r elements of the array with W amplitudes are transferred to the array with Lx*r amplitudes, while the oldest values of Lx*r elements of the array with W phases are transferred to the array with Lx*r phases;
- after that, the controller, outputting a flag of demodulation end, is reset, and some other controlling units affecting this controller are reset.

Figure 6C:
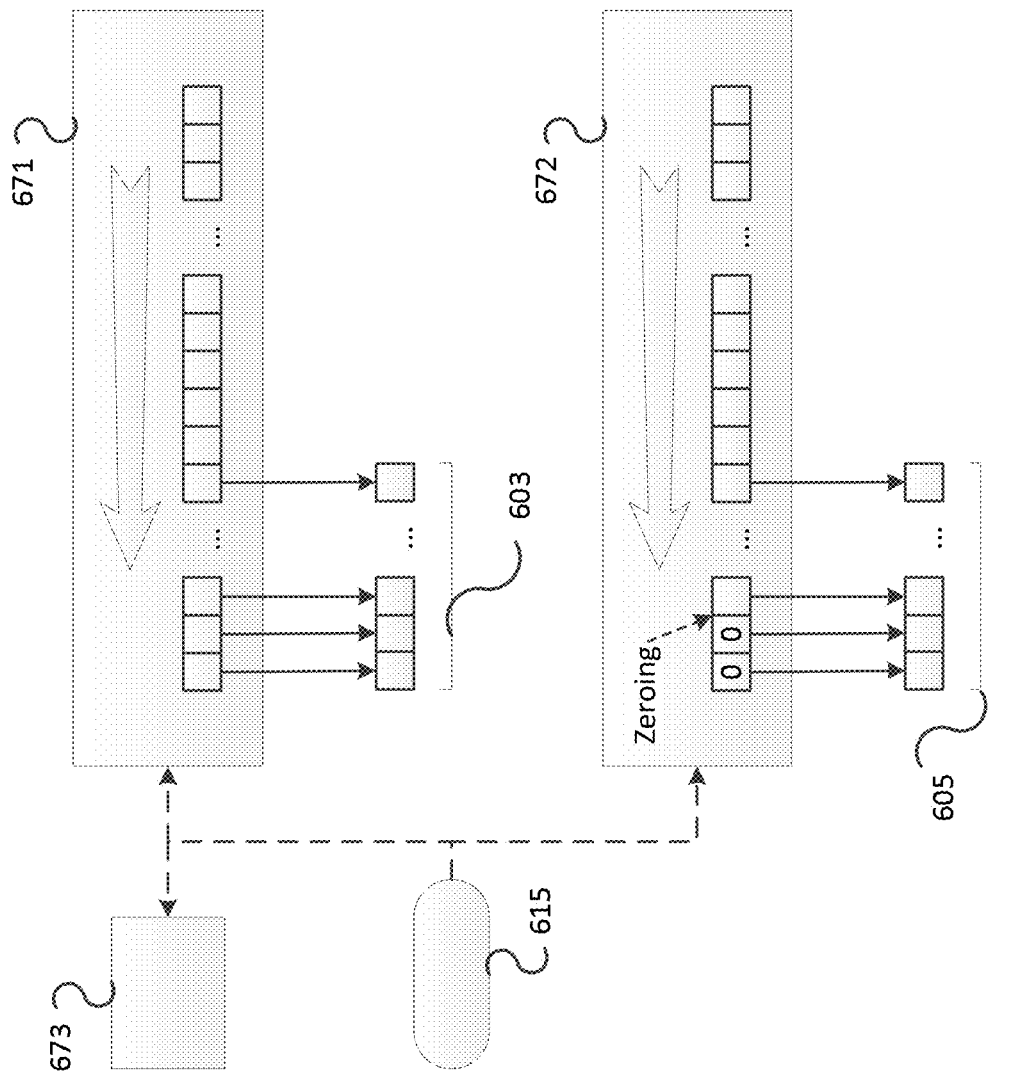

The time instant when the operations are performed is determined according to a flag of demodulation end outputted by the controller. An example of such an implementation is shown in FIG. 6C.

A flag of the end of demodulation from the controller 615 is fed to the array with W amplitudes 672 and W phases 671, as well as to counter 673. On this signal, arrays 671 and 672 are shifted by a predetermined amount. Moreover, in array 672, when crossing a certain border, the elements are reset to zero.

It should be noted that counter 673 is designed to determine the end of data in arrays 671 and 672. At the same time, zeroing the amplitudes in array 672 allows in some implementations not to take into account the values of the symbols to which these amplitudes refer, and thus demodulate a sequence of shorter length.

In other embodiments, the Lx-digit generator contains the following components:
- an Lx-digit shifting register, each digit of which stores values of the alphabet;
- a counter that counts the number of produced shifts in the shifting register;
- a unmodified Lx-digit register, each digit of which stores one value of symbol alphabet of the received signal;
- a digit-by-digit summer of the unmodified Lx-digit register with Lx-digit shifting register; and
- a verification unit verifying if the summed digits at the output of the digit-by-digit summer have a value out of the permitted symbol alphabet of the received signal.

In such embodiments, the Lx-digit shifting register is the output of the generator.

Figure 7:
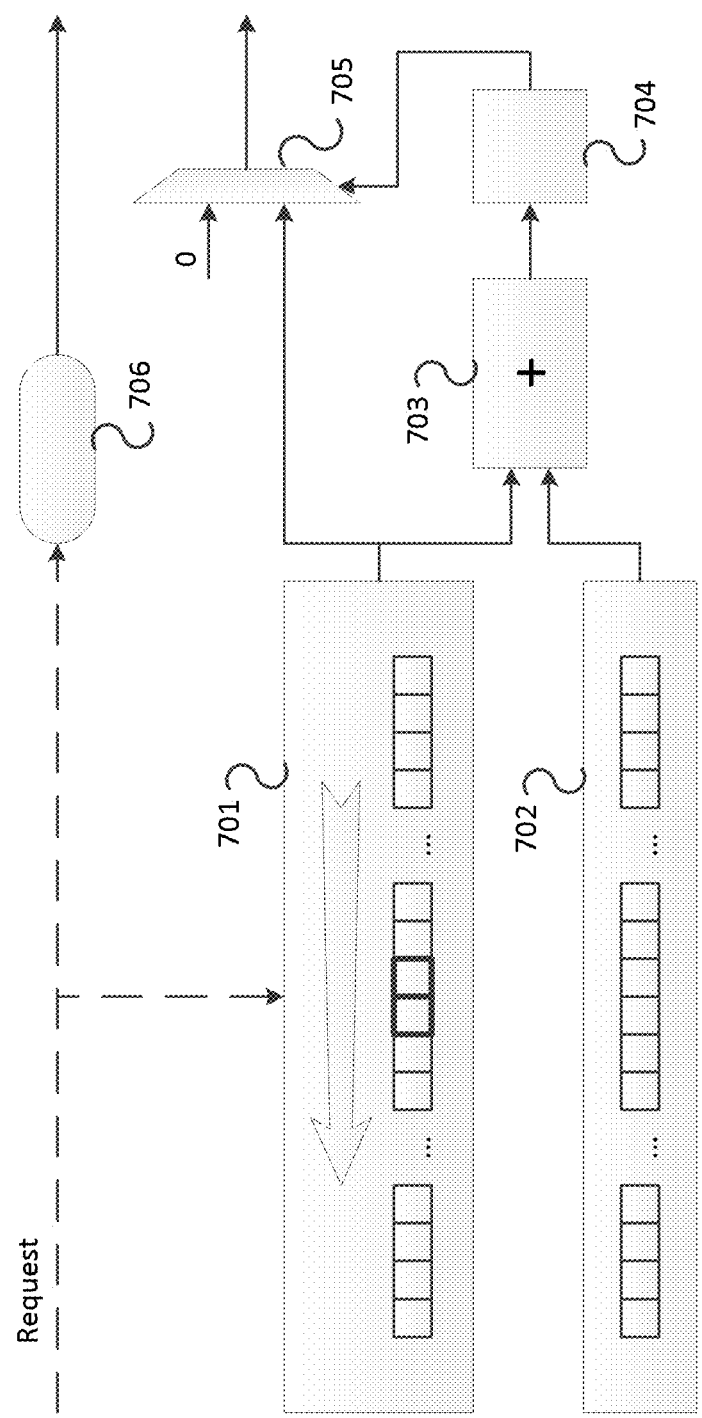
FIG. 7 shows an example of Lx-digit generator implemented as a shift register.

The quadrature estimator ignores those results which have impermissible value at least in one digit at the output of the digit-by-digit summer;

An example of such an embodiment is shown in FIG. 7. According to the proposed method in one embodiment, an initial pattern corresponding to one of possible error combinations is loaded in Lx-digit shifting register 701. For example, it could be a pair error in the neighboring symbols, the errors in these symbols having opposite signs. The rest pattern elements are zero. A pair of non-zero elements in the initial pattern is usually disposed at the edge, and respectively it falls into the ending digits of register 701. Once Request signal is received, the shifting register moves the contents of the register by a predetermined number of digits.

In the considered example, it means moving non-zero elements towards the middle and further to the opposite side of the register. At the same time, counter 706 is incremented by one. When the counter reaches a certain value, the corresponding signal is generated at the counter's output. After each register shift the shifting register is digit-by-digit added to non-shifting register 702 in summer 703. The result is estimated in verification unit 704. If at least one summed digit stands out of the assigned alphabet, a corresponding flag is generated at the output of the verification unit. In other embodiments, the output of the verification unit is fed to the control input of multiplexor 705.

The content of shifting register 701 is fed to one information input of the multiplexor, and a zero sequence of the same length is fed to the other input. When at the control input the flag of data invalidity is set, the multiplexor sends the zero sequence to the input, otherwise, the content of register 701 is sent. In some embodiments, the quadrature estimator ignores any results obtained at the zero sequence. In other embodiments, the quadrature estimator has no logic resulting in ignoring such results. In such embodiments, zero-sequence is included in the array of verified patterns as a first one. When the same sequence happens again, it is not better than the result already available, which is equivalent to its ignoring.

In some embodiments, the Lx-digit generator implemented as a shift register additionally contains a mechanism for loading the initial values of the Lx-digit shift register from a second memory and a load counter, into which the required number of the load operations values is loaded. In this case, the loading mechanism reads from the second memory a new value of the generator and a new value into the shift counter after the shift counter signals the completion of the required number of shifts of the previously loaded contents of the shift register. After completing the required downloads and completing the operations associated with them, the load counter generates a signal at the output, which is fed to the controller, which outputs a flag of the end of demodulation.

In other embodiments, the above the mechanism is implemented by a direct access to second memory (DMA).

In a number of embodiments with Lx-digit generator made in the form of a counter, the multi-input multiplier of arrays of length Lx*r by the alphabet values of the Lx-digit generator has Lx additional control inputs, with the positive, negative, or zero control value being applied to each input. If the control value is positive and the value at the input of the second type with the same number is positive, or if the control value is negative and the value at the input of the second type with the same number is negative, then during multiplication the value at the input of the second type with the given number doubles. In this case, the device also contains an array with Lx elements encoding a positive, negative or zero value, which are connected to additional inputs of the multi-input multiplier.

An example of such an implementation is a device decoding 4-CPFSK or 4-CPM signal (M=4), or decoding a signal with a greater M. Here, M1=4 or 5. In the proposed embodiment, the multi-input multiplier multiplies by 0, ±1, and ±2. At the first stage of signal processing the multipliers are determined by only digits of the Lx-digit generator, and zero is fed to the additional control inputs. At the second stage of signal processing multipliers ±2 are used with simultaneous value −1 in one of generator's digits and negative signal at the corresponding additional control input, or vice versa: with simultaneous value +1 in one of generator's digit and positive signal at the corresponding additional control input.

In another embodiment, a receiver further comprises a second iterator that iterates through a number of symbol sequences within Ly symbols that are stored in the memory, where Ly>Lx. In some of embodiments, the first iterator is used at the first and second stages of signal processing, whereas the second iterator is used at the third stage. Therefore, the second iterator is used by the processor to improve the stored Lx symbol sequences in the result storage of the first iterator.

In some embodiments the second iterator includes:
an Ly-digit generator of symbol sequences in the form of a shift register whose digits can be values of at least ternary and quaternary alphabet, the generator generates sequences by shifting an initial sequence
a generator of Ly*r length phase response, associated with the Ly-digit generator, that generates phase response by shifting an initial phase response
Ly*r summers that sum the Ly*r length phase responses with phases stored in the memory
a second converter that converts phases from the summers and corresponding amplitudes stored in the memory to the I/Q complex values
a second estimator being fed by the second converter output
a second result storage that stores an output of the Ly-digit generator when the second estimator indicates that the output of the Ly-digit generator is a better estimate compared to an estimate at which the previous content was stored.

In some implementations, the second iterator takes amplitudes and phases stored in the memory in the same arrays that are taken by the first iterator. In these implementations the memory also includes an array with Ly*r amplitudes and array with Ly*r phases.

In some embodiments the Ly-digit generator includes the following components:
an Ly-digit shift register
a counter that counts a number of produced shifts in the shift register
an unmodified Ly-digit register, each digit of which stores one value of a symbol alphabet of the M-CPFSK radio signal
a digit-by-digit summer that sums the unmodified Ly-digit register and the Ly-digit shifting register
a verification unit verifying whether summed digits at an output of the digit-by-digit summer have a value outside a range of the symbol alphabet of the M-CPFSK radio signal Here, an output of the Ly-digit shifting register is the output of the Ly-digit generator.

In some implementations the second estimator ignores those results that have a value outside the range of the symbol alphabet at least in one digit at the output of the digit-by-digit summer.

In some implementations the generator of the Ly*r length phase response includes a shifting storage of at least Ly*r values of phase response. In some of these implementations the second iterator loads values of the initial sequence into the Ly-digit generator and loads values of the initial phase response into the generator of the Ly*r length phase response from mentioned above second memory.

Figure 8:
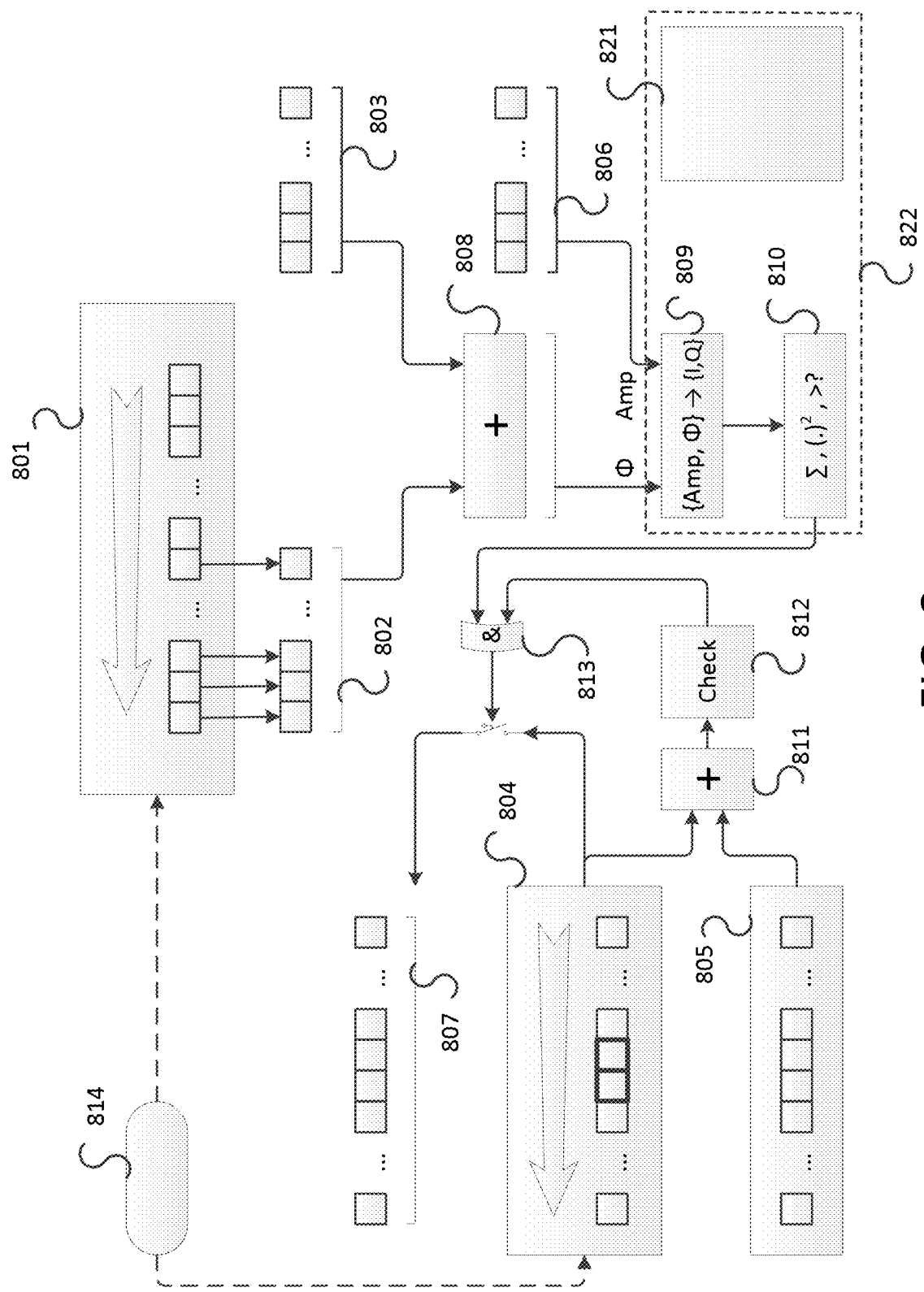
FIG. 8 shows an example of modem with a second iterator.

In some other implementations the generator of Ly*r length phase response includes an array with Lext*r phase increments implemented in the form of a shift register, at this Lext>Ly. In these implementations the Ly*r summers have two inputs, each summer calculates a sum of one element from array Lext*r of phase increments and one element of the array with Ly*r phases, the Ly*r edge elements from array Lext*r with phase increments being fed to the summer;

In some implementation the Ly-digit generator also includes a counter counting the number shifts produced in the shift register;

An example of such an implementation is shown in FIG. 8. The receiver which is depicted partially, includes two iterators. The first iterator 821 includes a generator implemented as a Lx-digit counter. The second iterator includes a generator implemented as a Ly-digit shift register 804. In this unit there is also shift register 801 to store an array with Lext*r phase increments. This shift register produces shift simultaneously with shift register 804. After each shift, Ly*r phases from register 801 forming array 802 are digit-by-digit added to phase array 803 with Ly*r values in summer 808.

The obtained array of total phases is fed to the first input of the second converter of Ly*r amplitudes and Ly*r phases to I/Q designated by 809 in the figure. The array with Ly*r amplitudes 806 is fed at the second input of the converter. Then, the output signal of the second converter is fed to second quadrature estimator 810. In the described receiver there is also counter 814 counting shifts of arrays 801 and 804. After each shift, register 804 is digit-by-digit added to unshifted register 805 in summer 811, and then in verification unit 812 the array of results is verified for compliance of the received digits to the used alphabet. The output signals of verification unit 812 and quadrature estimator 810 are fed to an AND gate 813. If both these outputs are positive, the AND gate closes the switch, and the content of shift register 804 is copied into register 807.

It should be noted that values of registers 801, 803, 804, 805, 806 are loaded there by a processor in some embodiments. The same processor reads the result from register 807, which is an exemplary second result storage that stores an output of the Ly-digit generator.

In other embodiments, the iterators do not include separate amplitude- and phase-to-I/Q converters. The first iterator is implemented as a combination of two components: unit 821 and converter 809. In another embodiment, a common part for both iterators also includes quadrature estimator 810. As a result, the first iterator designated by 822 is a combination of the three components: unit 821, converter 809, and quadrature estimator 810. Converter 809 and estimator 810 also are parts of the second iterator.

In some other embodiments, the iterators use the same converter of Lz*r amplitudes and Lz*r phases into I/Q, and the same quadrature estimator, at this, Lz≤Lx≤Ly.

It should be noted that in some embodiments, during reception of a single-h CPFSK or CPM signals register 804 is shifted by one element, and register 801 is shifted by r elements. At the same time, during reception of a multi-h CPM signal with cyclically-alternating modulation indexes, the registers are shifted by Hn=H/r and H elements respectively, where Hn is the number of modulation indexes h.

In some embodiments the memory stores an array with L4*r amplitudes, an array with L4*r phases, and the following actions are performed after each demodulation:
the array with L4*r amplitudes and the array with L4*r phases are moved forward by a predetermined value H that is a multiple of r;
during each movement, values of amplitude in some successive H elements of the array with L4*r amplitudes are zeroed;

after each movement, oldest values of Lx*r elements of the array with L4*r phases are transferred to the Lx*r summers in the first iterator, and then summed with the Lx*r phases stored in the memory, Here, the oldest values of the Lx*r elements of the array with L4*r amplitudes are inputted to the converter in the first iterator One skilled in the art can construct the system described herein from various combinations of hardware, firmware, and software. One skilled in the art can construct the system described herein from various discrete and integrated electronic components, including one or more general purpose processors (such as microprocessors), one or more digital signal processors, one or more application-specific integrated circuits (ASICs), and one or more field-programmable gate arrays (FPGAs).

Having thus described a preferred embodiment, it should be apparent to those skilled in the art that certain advantages of the described method and system have been achieved.

It should also be appreciated that various modifications, adaptations, and alternative embodiments thereof may be made within the scope and spirit of the present invention. The invention is further defined by the following claims.

REFERENCES (ALL INCORPORATED HEREIN BY REFERENCE IN THEIR ENTIRETY)

[1a] IRIG-106-15 telemetry standard, chapter 2
[1] John G. Proakis, "Digital Communication", McGraw-Hill (2008)
[2] John B. Anderson et al., "Digital Phase Modulation", Plenum Press (1986).
[3] Jim Zyren and Pierre Gandolfo, *Analysis and Simulation of Overlapped Frequency Hopping Channels*, September 1999, doc.: IEEE 802.11-99/202, chapter 3.3
[4] You Zhou et al., *A Low-complexity Noncoherent Maximum Likelihood Sequence Detection Scheme for CPM in Aeronautical Telemetry*, International Journal of Aerospace Engineering, January 2018
[5] U.S. Pat. No. 7,636,399 B2
[7] U.S. Pat. No. 8,644,425 B2
[8] CA2675643 A1
[9] LIU Xian et al., Design of Multiple Trellis-Coded Multi-h CPM Based on Super Trellis, RADIOENGINEERING, VOL. 21, NO. 4, DECEMBER 2012
[10] James A. Norris et al., "Demodulation Improvement Analysis of Quasi-Coherent CPM", SPIE 2014

What is claimed is:

1. A method of demodulation of a multi-level continuous phase frequency shift keying (M-CPFSK) signal with M≥4 modulation levels, comprising:
 (a) receiving the M-CPFSK signal;
 (b) moving the M-CPFSK signal to zero frequency;
 (c) sampling the moved signal at no less than double a frequency of symbols, wherein each sample is described via amplitude and phase;
 (d) storing the samples with their amplitude and phase in a memory for at least L4 symbols;
 (e) demodulating the sampled signal represented by the amplitude and phase at least in three stages, wherein each stage includes iterating over symbol values within a block of symbols, whose length is L1 at a first stage, L2 at a second stage, and L3 at a third stage, wherein L1<L2<L3<L4, and
 wherein, in the first stage, N1 symbol sequences out of all possible symbol sequences ($M^{L1}$) are iterated over, at the second stage, N2 symbol sequences out of all possible symbol sequences ($M^{L2}$) are iterated over, and at the third stage, N3 symbol sequences out of all possible symbol sequences ($M^{L3}$) are iterated over, such that $N1/M^{L1} > N2/M^{L2} > N3/M^{L3}$, to obtain final symbol values;
 wherein symbol values obtained at a previous stage are used in a next stage to reduce a number of symbol sequences being iterated over; and
 (f) determining encoded bits in the M-CPFSK signal based on the final symbol values.

2. The method of claim 1, wherein, in (e) before the first stage, preliminary assumptions about values of the received L4 symbols are stored in an array X0, then, as a result of the first stage, corresponding corrections to X0 are stored in an array X1, then, as result of the second stage, corrections to X1 are stored in an array X2, and then, as a result of the third stage, corrections to X2 are stored in an array X3, and
 further calculating element-by-element arrays X1c=X0+X1, X2c=X1c+X2, X3c=X2c+X3, each element of X0, X1c, X2c and X3c belonging to an alphabet S={-(M-1), -(M-3), . . . , -1, +1, . . . , (M-3), (M-1)}, and
 wherein the encoded bits in (f) are represented by X3c.

3. The method of claim 2, wherein, in (e) a phase of each sample corresponding to each demodulated symbol is modified according to X0 before performing the first stage, and modified according to X1, X2 and X3 after the first, second and third stages, respectively,
 the phase modifications reversing phase rotations generated by an M-CPFSK modulator on a transmitter side, by using X0 or X1 or X2 or X3 correspondingly, such that for a correct value of X0, X1c, X2c and X3c, an unmodulated carrier wave is obtained.

4. The method of claim 3, wherein at M=4 all symbol values in X0 are either -1 or +1.

5. The method of claim 3, wherein in (e) after each iterating through N1 sequences of L1 symbols, values of R1 symbols in the L1 symbols are further used as results of the demodulation, and
 after each iterating through N2 sequences of L2 symbols, values of R2 symbols are further used as results of the demodulation, and
 after each iterating through N3 sequences of L3 symbols, values of R3 symbols are further used as results of the demodulation, where R1<L1, R2<L2, R3<L3.

6. The method of claim 5, wherein, the demodulation in step (e) is performed for a window containing L1 or L2 or L3 symbols, and the window is moved by R1 or R2 or R3, respectively, and the demodulation in step (e) is performed again for the next R1 or R2 or R3 symbols, and so on.

7. The method of claim 6, wherein, in the first stage, D1 demodulations are done by a suboptimal method for the L1 symbols, where D1≈(L4-L1)/R1, each demodulation being performed by iterating through $M1^{L1}$ sequences of L1 symbols, where M1=4 if M=4, and M1=4 or 5 if M>4;
 R1 values from a selected sequence of each demodulation are stored in the array X1;
 the array X1 is modified such that in the second stage, symbols are iterated using 3 most probable symbol values within the alphabet S.

8. The method of claim 7, wherein for each element in X1, a current value, a current value +2 and a current value -2, using modulo S, are considered more probable than remaining M-3 values of each symbol, where the modulo S being applied as a wrap around so that all three considered values belong to the alphabet S.

9. The method of claim 8, wherein, in the second stage, D2 demodulations are done by a suboptimal method for L2 symbols, where D2≈(L4−L2)/R2, each demodulation being produced by iterating through $3^{L2}$ sequences of L2 symbols resulting in R2 improvements; and the R2 improvements from a selected sequence of each demodulation are stored in the array X2.

10. The method of claim 8, wherein, in the third stage, D3 demodulations are done by a suboptimal method for L3 symbols, where D3≈(L4−L3)/R3, each demodulation being produced by iterating through the most probable error sequences within the block of L3 symbols resulting in R3 improvements; and the R3 improvements are stored in the array X3, wherein, the most probable error sequences include sequences with L3−2 zero elements and 2 adjacent nonzero elements with values +2, −2 or −2, +2 and include sequences with L3−1 zero elements and the only nonzero element with a value +2 or −2.

11. The method of claim 1, wherein the M-CPFSK signal is a CPM (continuous phase modulation) or PCM/FM (pulse code modulation/frequency modulation) signal.

12. The method of claim 1, wherein the M-CPFSK signal is multi-h CPM (continuous phase modulation) signal, where h is a modulation index.

13. The method of claim 1, wherein the M-CPFSK signal is a CPM (continuous phase modulation) signal with a single modulation index h.

14. The method of claim 3, wherein for M>4, preliminary symbol values are obtained with a symbol-by-symbol limiter/discriminator algorithm, including:

in a middle of symbol, a difference between phases of adjacent samples is calculated;

the phase difference is rescaled to instantaneous frequency; and a nearest frequency from M reference frequencies is selected, and a symbol value related to the selected frequency is used.

15. The method of claim 1, wherein, in (e), each sequence of symbols is iterated using following steps:

the iterated sequence of symbol values is filled by r−1 zeros between each symbol value, where r is a number of samples per symbol;

the filled sequence is filtered using a phase response to a symbol with a value +1;

values in the filtered sequence related to a time window with the iterated symbols are subtracted from sample phases stored in the memory for the iterated symbols;

resulting phases and corresponding amplitudes are converted to I/Q (in phase/quadrature) complex values to produce Lx*r complex values, where Lx=L1 or L2 or L3; and a metric of the iterated sequence is calculated based on the complex values and becomes a criterion of maximum likelihood.

16. The method of claim 1, wherein, in (e), each sequence of symbols is iterated using following steps:

the iterated sequence of symbol values is filled by r−1 zeros between each symbol value, where r is a number of samples per symbol;

a phase response to one symbol is filtered using the filled sequence;

values in the filtered sequence related to a time window with the iterated symbols are subtracted from sample phases stored in the memory for the iterated symbols;

resulting phases and corresponding amplitudes are converted to I/Q (in phase/quadrature) complex values to produce Lx*r complex values, where Lx=L1 or L2 or L3; and a metric of the iterated sequence is calculated based on the complex values and becomes a criterion of maximum likelihood.

17. The method of claim 15, wherein when comparing the iterated sequences of symbol values, a sequence in which a sum of the Lx*r complex values is maximum is selected as a result of the demodulation in (e).

18. The method of claim 17, wherein when comparing the iterated sequences of symbol values, a sequence in which a discrepancy between the Lx*r complex values and a reference vector is minimum is selected as a result of the demodulation result in (e).

19. The method of claim 18, wherein a phase of the reference vector is specified by a carrier PLL (phase locked loop).

20. The method of claim 19, wherein the M-CPFSK signal is a CPM (continuous phase modulation) signal with a finite number of phase states, and whose reference vector is equal to an arithmetic mean of the demodulated samples, and whose phase is rotated to a nearest CPM phase state, and wherein phase states of the CPM signal being described by $\phi+2*\pi*i/k$, where k is a number of phase states, and i is a number of a phase state from 1 through k, where $\phi$ is estimated with the carrier PLL based on an arithmetic mean of demodulated samples in previous symbol blocks.

21. A receiver of multi-level continuous phase frequency shift keying (M-CPFSK) signal with M≥4 modulation levels, comprising:

(a) an antenna receiving the M-CPFSK signal;

(b) a mixer that moves the M-CPFSK signal to zero frequency;

(c) an analog to digital converter (ADC) sampling the moved signal at no less than twice a frequency of symbols, wherein each sample is described by an amplitude and phase;

(d) a memory storing the samples, including their amplitude and phase, for at least L4 symbols;

(e) at least one iterator that iterates through a number of symbol sequences within Lx symbols, the iterator comprising (1) an Lx-digit generator of symbol sequences, (2) a storage with a phase response to one symbol, (3) a filter with a first input connected to the storage, and a second input connected to the Lx-digit generator, the filter outputting Lx*r calculated phases, where r is a number of samples per symbol, (4) Lx*r summers that sum the Lx*r calculated phases with Lx*r phases stored in the memory, (5) a converter that converts the Lx*r summed phases from the summers and corresponding amplitudes stored in the memory into I/Q (in phase/quadrature) complex values, (6) an estimator inputting the I/Q complex values and producing a metric of likelihood of a symbol sequence associated with the Lx symbol sequences from the Lx-digit generator, (7) a result storage that stores the Lx symbol sequences when the estimator indicates that the sequence from (1) as being a best estimate compared to a previous estimate; and (f) a processor, connected to the ADC, to the memory storing at least L4 symbols, to the storage with phase response and to the result storage, the processor configured to determine encoded bits in the M-CPFSK signal based on the result in (7).

22. The receiver of claim 21, wherein the Lx-digit generator includes a counter for counting ternary and quaternary digits.

23. The receiver of claim 22, wherein the filter includes Lx*r convolvers, each convolver performing a convolution of first and second arrays, the first array corresponding to phases from the storage in (2) and the second array being Lx digits from the Lx-digit generator, wherein the convolvers output the Lx*r calculated phases.

24. The receiver of claim 23, wherein the first array is formed for a convolver i by taking values from the storage in (2) with numbers i+k*r+C, where k=1 ... Lx, i is 1 ... Lx, and C is an integer constant.

25. The receiver of claim 22, wherein the filter includes:
 a multi-input multiplier that multiplies Lx*r length arrays by digits of the Lx-digit generator, the multi-input multiplier comprises Lx inputs of a first type, Lx inputs of a second type, and Lx outputs, where each output is a multiplication product of one input of the first type and one input of the second type,
 the multiplied Lx*r length arrays are fed to the input of the first type and a multiplied digit, which is one digit of the Lx-digit generator, is fed to the input of the second type, where, for each multiplication, a number of first type input, a number of digit at the second type input and a number of produced output are identical,
 a commutator switch, whose first input receives a phase response, and whose Lx outputs are connected to the Lx inputs of the first type of the multi-input multiplier; and
 the Lx*r summers with Lx inputs, each summer calculates a sum of elements with the same number in the Lx outputs of the multi-input multiplier;
 wherein outputs of the Lx*r summers form a filter output with Lx*r calculated phases.

26. The receiver of claim 21, further comprising a second iterator that iterates through a number of symbol sequences within Ly symbols that are stored in the memory, where Ly>Lx, and wherein the second iterator improves the stored Lx symbol sequences in (7).

27. The receiver of claim 26, wherein the second iterator comprises:
 (1) an Ly-digit generator of symbol sequences that generates sequences by shifting an initial sequence,
 (2) a generator of Ly*r length phase response, associated with the Ly-digit generator, that generates Ly*r length phase response by shifting an initial phase response,
 (3) Ly*r summers that sum Ly*r length phase responses with phases stored in the memory,
 (4) a second converter that converts phases from the Ly*r summers and corresponding amplitudes stored in the memory to the I/Q complex values,
 (5) a second estimator being fed by a second converter output, and
 (6) a second result storage that stores an output of the Ly-digit generator when the second estimator indicates that the output of the Ly-digit generator is a better estimate compared to an estimate at which the previous content was stored.

28. The receiver of claim 27, wherein the Ly-digit generator includes the following components:
 (i) an Ly-digit shift register;
 (ii) a counter that counts a number of produced shifts in the Ly-digit shift register;
 (iii) an unmodified Ly-digit register, each digit of which stores one value of a symbol alphabet of the M-CPFSK signal;
 (iv) a digit-by-digit summer that sums the unmodified Ly-digit shift register and the Ly-digit shift register;
 (v) a verification unit verifying whether summed digits at an output of the digit-by-digit summer have a value outside a range of the symbol alphabet of the M-CPFSK signal;
 wherein:
 an output of the Ly-digit shift register is the output of the Ly-digit generator;
 the second estimator ignores results that have a value outside the range of the symbol alphabet at least in one digit at the output of the digit-by-digit summer.

29. The receiver of claim 27, wherein the generator of the Ly*r length phase response includes a shifting storage of at least Ly*r values of phase response.

30. The receiver of claim 27, wherein the second iterator loads values of the initial sequence into the Ly-digit generator and loads values of the initial phase response into the generator of the Ly*r length phase response from a second memory.

31. The receiver of claim 21, wherein the storage in (2) stores a first array with L*r phase increments, and
 wherein in the filter the first array with L*r phase increments is supplemented at a beginning and at an end with (Lx−L)*r values, the supplemented values at the beginning being equal to a value of a first element in the first array of phase increments, and the supplemented values at the end being equal to a last element in the first array of phase increments.

32. The receiver of claim 31, wherein the storage in (2) contains at least one additional array with L*r phase increments, the additional array representing a phase response to one symbol at a different modulation index h, and wherein the arrays with L*r phase increments are symbol-by-symbol multiplexed in the filter so that r phase increments are taken from the first array and not taken from the additional array, then r increments are taken from the additional array and not taken from the first array, and so on.

33. The receiver of claim 21, wherein the memory stores an array with L4*r amplitudes, an array with L4*r phases, and wherein the following actions are performed after each demodulation:
 the array with L4*r amplitudes and the array with L4*r phases are moved forward by a predetermined value H that is a multiple of r;
 during each movement, values of amplitude in some successive H elements of the array with L4*r amplitudes are zeroed;
 after each movement, oldest values of Lx*r elements of the array with L4*r phases are transferred to the Lx*r summers in the first iterator, and then summed with the Lx*r phases stored in the memory, and
 wherein the oldest values of the Lx*r elements of the array with L4*r amplitudes are inputted to the converter in the first iterator.

34. A method of demodulation of a multi-level continuous phase frequency shift keying (M-CPFSK) signal with M≥4 modulation levels, comprising:
 (a) receiving the M-CPFSK signal;
 (b) sampling the signal, wherein each sample is described via amplitude and phase;
 (c) storing the samples with their amplitude and phase in a memory;
 (d) demodulating the sampled signal represented by the amplitude and phase in several stages, wherein each stage includes iterating over symbol values within a block of symbols, whose length at each next stage increases, wherein a ratio of a number of iterated symbol sequences to a number of all possible symbol sequences at each next stage decreases, and wherein symbol values obtained at a previous stage are used in a next stage to reduce a number of symbol sequences being iterated over;

(e) obtaining final symbol values from a last stage in (d); and (f) determining encoded bits in the M-CPFSK signal based on the final symbol values.

35. The method of claim 34, further comprising:

applying sample phase modifications that reverse phase rotations on a transmitter side in assumption that the iterated symbol sequence has been sent, calculating a metric of each iterated sequence based on complex values of the samples after the sample phase modifications, the metric being used as a criterion of maximum likelihood, and selecting a sequence with a best metric as a result of the demodulation in (d) when comparing the iterated sequences of symbol values.

36. The method of claim 35, wherein a sequence that meets a maximum likelihood criterion is a sequence when samples after phase modifications are closest to those of a non-modulated carrier.

37. A receiver of multi-level continuous phase frequency shift keying (M-CPFSK) signal with M≥4 modulation levels, comprising:

(a) an antenna receiving the M-CPFSK signal;

(b) an analog to digital converter (ADC) sampling the signal, wherein each sample is described by an amplitude and phase;

(c) a memory storing the samples, including their amplitude and phase, for symbols in the sampled signal;

(d) at least one iterator that iterates through multiple symbol sequences within a block of symbols, wherein a phase response to a single symbol is multiplied by each element in an iterated symbol sequence, multiplication products are summed based on positions of the elements so that phase modifications for the stored samples are formed, and a metric, based on the formed phase modifications and the sample amplitudes and phases from (c) is calculated and then used to define a sequence that has been sent by an M-CPFSK transmitter; and (e) a processor, connected to the ADC, to the memory and to the iterator, the processor configured to determine encoded bits in the M-CPFSK signal based on the defined sequence.

38. The receiver of claim 37, wherein:

the phases of the samples are put in a matrix-row A;

the amplitudes of the samples are put in a matrix-row Amp;

a phase response to a symbol is placed in each row of a matrix B at a position related to its row number, while a value of the symbol is 1;

rows of the matrix B are multiplied by the elements, each row by an element corresponding to the row numbers, thereby obtaining a matrix B1;

a row-matrix C=A+sum(B1) is calculated, where sum(B1) calculates the row-matrix with values equal to sums of columns of the original matrix B1;

a row-matrix V=CORDIC(Amp,C) is calculated; and complex values of the row-matrix V are summed to calculate the metric of the iterated sequence.

* * * * *